(12) United States Patent
Kamei et al.

(10) Patent No.: US 10,808,066 B2
(45) Date of Patent: Oct. 20, 2020

(54) HYDROGENATED COPOLYMER, COMPOSITION, AND MOLDED ARTICLE

(71) Applicant: Asahi Kasei Kabushiki Kaisha, Tokyo (JP)

(72) Inventors: Yuta Kamei, Tokyo (JP); Toshikazu Hoshina, Tokyo (JP); Yasuhiro Kusanose, Tokyo (JP); Masahiro Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 181 days.

(21) Appl. No.: 16/069,343

(22) PCT Filed: Jan. 16, 2017

(86) PCT No.: PCT/JP2017/001233
§ 371 (c)(1),
(2) Date: Jul. 11, 2018

(87) PCT Pub. No.: WO2017/126469
PCT Pub. Date: Jul. 27, 2017

(65) Prior Publication Data
US 2019/0016842 A1    Jan. 17, 2019

(30) Foreign Application Priority Data

Jan. 19, 2016 (JP) .................. 2016-008245

(51) Int. Cl.
| | | |
|---|---|---|
| C08F 297/04 | (2006.01) | |
| C08F 8/04 | (2006.01) | |
| B32B 27/28 | (2006.01) | |
| C09J 153/02 | (2006.01) | |
| C08J 5/18 | (2006.01) | |
| B32B 27/30 | (2006.01) | |

(52) U.S. Cl.
CPC .......... *C08F 297/04* (2013.01); *B32B 27/302* (2013.01); *C08F 8/04* (2013.01); *C08F 297/044* (2013.01); *C08J 5/18* (2013.01); *C09J 153/025* (2013.01); *C08J 2353/02* (2013.01)

(58) Field of Classification Search
USPC ................... 525/331.9, 940, 332.9
See application file for complete search history.

(56) References Cited

U.S. PATENT DOCUMENTS

| | | |
|---|---|---|
| 2004/0039128 A1 | 2/2004 | Sasagawa et al. |
| 2005/0107521 A1 | 5/2005 | Sasagawa et al. |
| 2006/0178485 A1 | 8/2006 | Shimakage et al. |
| 2007/0179220 A1 | 8/2007 | Sasagawa et al. |
| 2010/0068452 A1 | 3/2010 | Kusanose et al. |

FOREIGN PATENT DOCUMENTS

| | | | |
|---|---|---|---|
| CN | 1476452 A | 2/2004 | |
| CN | 101616985 A | 12/2009 | |
| DE | 112009001781 B4 * | 12/2014 | ............. C08L 53/02 |
| EP | 1449856 A1 | 8/2004 | |
| EP | 3348591 A1 | 7/2018 | |
| JP | H06-184253 A | 7/1994 | |
| JP | 2005-126485 A | 5/2005 | |
| JP | 2005-255882 A | 9/2005 | |
| JP | 2006-225477 A | 8/2006 | |
| WO | 2010/018743 A1 | 2/2010 | |
| WO | 2016/127355 A1 | 8/2016 | |

OTHER PUBLICATIONS

Online translation of Detailed Description of WO 2016/127355 A1; publication date: Aug. 18, 2016. (Year: 2016).*
Online translation of Detailed Description of DE 112009001781 B4; publication date: Dec. 2014. (Year: 2014).*
International Preliminary Report on Patentability and Written Opinion issued in corresponding International Patent Application No. PCT/JP2017/001233 dated Jul. 24, 2018.
Supplemental European Search Report issued in corresponding European Patent Application No. 17741347.3 dated Nov. 29, 2018.
International Search Report issued in corresponding International Patent Application No. PCT/JP2017/001233 dated Feb. 7, 2017.

* cited by examiner

*Primary Examiner* — Fred M Teskin
(74) *Attorney, Agent, or Firm* — Morgan, Lewis & Bockius LLP

(57) ABSTRACT

A hydrogenated copolymer comprising
  a copolymer block A comprising a vinyl aromatic compound monomer unit and a conjugated diene monomer unit,
  wherein a tan δ peak obtained by dynamic viscoelasticity measurement (1 Hz) is in the range of −40° C. to 20° C.,
  a value of the tan δ peak is 0.8 or more, and
  a half value width of the tan δ peak is 22° C. or less.

10 Claims, No Drawings

HYDROGENATED COPOLYMER, COMPOSITION, AND MOLDED ARTICLE

TECHNICAL FIELD

The present invention relates to a hydrogenated polymer, a composition containing the hydrogenated copolymer, and a molded article.

BACKGROUND ART

Copolymers comprising a vinyl aromatic compound monomer and a conjugated diene monomer, which have elasticity comparable to that of natural rubber and synthetic rubber at normal temperature, even when not vulcanized, and furthermore have processability comparable to that of a thermoplastic resin at high temperatures, are widely used in fields such as footwear, plastic modification, asphalt modification, and viscous adhesive materials, household products, packaging materials for consumer electrical appliances and industrial parts, toys, and the like.

The hydrogenated products of the block copolymer, which has excellent weatherability and heat resistance, are widely used also in automotive parts and medical devices in addition to the application fields as aforementioned.

Meanwhile, smartphones, tablets, and thin-screen television have become widespread in recently years. In order to prevent smudges and scratches during processing and transport of optical films and optical resin sheets constituting these devices, surface protection films are frequently used.

The surface protection films are used in order to protect the surfaces of synthetic resin sheets and stainless sheets for construction materials, aluminum sheets, decorative plywood, steel sheets, glass plates, furniture, fixtures, consumer electrical appliances, precision instruments, automobiles, prism sheets used in optical applications, and the like from scratches, dirt, and smudges.

The surface protection film is configured to include a tacky layer formed on a predetermined support, and tacky adhesives constituting such a tacky layer have conventionally been proposed variously.

Conventionally, acrylic tacky adhesives, and rubber-based tacky adhesives mainly containing rubbers such as natural rubber and polyisobutylene, are primarily used as tacky adhesives for the tacky layer of such a surface protection film.

Methods involving applying, with a roll, spray, or the like, a tacky adhesive solution in which a tacky adhesive is dissolved in a solvent are used as methods for applying such a tacky adhesive to a predetermined support film. Although such methods are capable of forming the tacky adhesive layer uniformly and thinly and are thus advantageous, the methods have a problem in that the use of a solvent is not preferable from the viewpoint of air pollution, fire, safety and health during production, economy, and so on.

For such a reason, recently, coextrusion films have been suitably used that integrally includes a substrate layer made of a polyolefin resin and a tacky adhesive layer containing a hydrogenated styrene elastomer or olefinic elastomer.

Adherends of such surface protection films have become diversified recently. Some adherends have a flat surface, and other adherends have complex unevenness on their surface. Examples of adherends having unevenness on their surface include prism sheets used as optical members and the like. In order to exhibit good tack strength during use to such adherends having unevenness on their surface, it is necessary to improve the tack strength of the tacky layer constituting the surface protection film such that sufficient tack strength is achieved even with a small contact area, and various materials constituting the tacky adhesive layer have been proposed conventionally.

For example, Patent Literature 1 discloses a hydrogenated copolymer configured to contain: at least one of a polymer block A comprising a vinyl aromatic monomer unit or a hydrogenated polymer block C comprising a conjugated diene monomer unit and having a specific amount of vinyl bonds; and contain at least one hydrogenated random copolymer block B comprising a vinyl aromatic monomer unit and conjugated diene monomer unit and having a specific amount of vinyl bonds.

CITATION LIST

Patent Literature

Patent Literature 1: Japanese Patent Laid-Open No. 2005-126485

SUMMARY OF INVENTION

Technical Problem

The hydrogenated copolymer disclosed in Patent Literature 1 is unlikely to undergo a change over time in tack strength and to be soiled with an adhesive residue. Meanwhile, when practically used as a tacky adhesive material of protection films for optical products, the hydrogenated copolymer has a problem of its poor handleability.

Specifically, when a protection film in a rolled form is attached to the surface of a product, tacky surfaces may adhere to each other. If these surfaces are peeled off for use, there is a problem in that the surfaces fracture and become unusable.

When surface protection films having a larger area than that of a product are attached to the top and bottom surfaces of the product, excessive portions of the surface protection films attached to the top and bottom surfaces adhere to each other, and thus, there is a problem of poor handleability when a portion or the whole of the films is entirely peeled off for inspection or finished product assembly.

Easy peelability between tacky surfaces is required in order to prevent the problems described above from occurring.

In view of the aforementioned problems of conventional art, an object of the present invention is to provide a hydrogenated copolymer that provides excellent easy peelability between tacky surfaces when used as a tacky adhesive material, a composition containing the hydrogenated copolymer, and a molded article.

Solution to Problem

In order to solve the above problems of conventional art, the inventors have conducted diligent research and, as a result, have found that a hydrogenated copolymer having a specific structure effectively solves the above problems, having accomplished the present invention.

That is to say, the present invention is as set forth below.

[1]

A hydrogenated copolymer comprising
a copolymer block A comprising a vinyl aromatic compound monomer unit and a conjugated diene monomer unit, wherein a tan δ peak obtained by dynamic viscoelasticity measurement (1 Hz) is in the range of −40° C. to 20° C., a value of the tan δ peak is 0.8 or more, and a half value width of the tan δ peak is 22° C. or less.

[2]

The hydrogenated copolymer according to [1], wherein the conjugated diene monomer unit in the hydrogenated copolymer has an amount of vinyl bonds of 50% or more before hydrogenation.

[3]

The hydrogenated copolymer according to [1] or [2], wherein a content of the vinyl aromatic compound monomer unit in the hydrogenated copolymer is 10 to 50 mass %.

[4]

The hydrogenated copolymer according to any one of [1] to [3], wherein a mass ratio of the vinyl aromatic monomer unit to the conjugated diene monomer unit contained in the copolymer block A of the hydrogenated copolymer is vinyl aromatic monomer unit/conjugated diene monomer unit=5/95 to 40/60.

[5]

The hydrogenated copolymer according to any one of [1] to [4], wherein the hydrogenated copolymer has a degree of hydrogenation of double bonds based on the conjugated diene monomer unit of 85% or more.

[6]

The hydrogenated copolymer according to any one of [1] to [5], having a structure of $B-(A-B)_n$, $(B-A)_n$, $[(B-A)_n]_m-X$, or $C-(B-A-B)_n$, wherein:

A: a copolymer block comprising a vinyl aromatic compound monomer unit and a conjugated diene monomer unit, B: a polymer block of a vinyl aromatic compound monomer, C: a polymer block of a conjugated diene monomer, m: an integer of 2 or greater, and n: an integer of 1 or greater.

The hydrogenated copolymer according to any one of [1] to [6], wherein the hydrogenated copolymer has a melt flow rate (g/10 min) of 1 to 50 g/10 min at a temperature of 230° C. under a load of 2.16 kg.

[8]

The hydrogenated copolymer according to any one of [1] to [7], having a weight average molecular weight of 5 to 200,000.

[9]

A composition comprising the hydrogenated copolymer according to any one of [1] to [8].

[10]

A molded article comprising the hydrogenated copolymer according to any one of [1] to [8].

[11]

A surface protection film comprising the hydrogenated copolymer according to any one of [1] to [8].

Advantageous Effect of Invention

According to the present invention, a hydrogenated copolymer that provides excellent easy peelability between tacky surfaces, a composition containing the hydrogenated copolymer, and a molded article can be provided.

DESCRIPTION OF EMBODIMENT

Hereinafter, an embodiment for carrying out the present invention (hereinafter referred to as "the present embodiment") will now be described in detail, but the present invention is not limited to the following embodiment, and can be performed after making various modifications within the scope of the present invention.

[Hydrogenated Copolymer]

The hydrogenated copolymer of the present embodiment comprises a copolymer block A comprising a vinyl aromatic compound monomer unit and a conjugated diene monomer unit, wherein a tan δ peak obtained by dynamic viscoelasticity measurement (1 Hz) is in the range of −40° C. to 20° C., the value of the tan δ peak is 0.8 or more, and the half value width of the tan δ peak is 22° C. or less.

Surface protection films are required to be easily peeled off without failure of tacky surfaces if the tacky surfaces adhere to each other. The hydrogenated copolymer of the present embodiment, when used as a tacky adhesive material, has a property of excellent easy peelability between tacky surfaces by having the structure described above.

In the present embodiment, each monomer unit constituting the block copolymer is named after the monomer from which the monomer unit is derived.

For example, the "vinyl aromatic compound monomer unit" means a constitutional unit of a polymer produced as a result of polymerizing a monomer vinyl aromatic, and has a molecular structure in which two carbon atoms of a substituted ethylene group derived from a substituted vinyl group serve as bonding sites.

Moreover, the "conjugated diene monomer unit" means a constitutional unit of a polymer produced as a result of polymerizing a monomer conjugated diene, and has a molecular structure in which two carbon atoms of an olefin derived from the conjugated diene monomer serve as bonding sites.

The hydrogenated copolymer of the present embodiment comprises a copolymer block A comprising a vinyl aromatic monomer unit and a conjugated diene monomer unit (hereinafter, may be referred to as copolymer block A or block A).

Examples of the "vinyl aromatic compound monomer" constituting the "vinyl aromatic monomer unit" in the hydrogenated copolymer of the present embodiment include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Of these, styrene, α-methylstyrene and 4-methylstyrene are preferred from the viewpoint of availability and productivity. Of these, styrene is particularly preferred.

Only one of these may be used singly, and two or more of these may be used in combination.

The "conjugated diene monomer" constituting the "conjugated diene monomer unit" in the hydrogenated copolymer of the present embodiment is a diolefin having a pair of conjugated double bonds, and examples thereof include, but are not limited, to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and Farnesene.

Examples of particularly common diolefins include 1,3-butadiene and isoprene, which are preferred.

Only one of these may be used singly, and two or more of these may be used in combination.

The content of the vinyl aromatic compound monomer unit in the hydrogenated copolymer of the present embodiment is preferably in the range of 10 to 50 mass %, more preferably in the range of 13 to 45 mass %, and even more preferably in the range of 15 to 40 mass %.

When the content of the vinyl aromatic monomer unit is 50 mass % or less, the adhesion and tackiness become better.

When the content is 10 mass % or more, increase in tackiness can be suppressed, there is a tendency that an adhesive residue and a stop mark are unlikely to occur, easy peelability between tacky surfaces becomes good, and therefore such a content is preferable.

The content of the vinyl aromatic compound monomer unit in the hydrogenated copolymer of the present embodiment can be measured by the method described in the Examples below. The content of the vinyl aromatic compound monomer unit is nearly identical before and after hydrogenation, and therefore the vinyl aromatic compound content in the copolymer before hydrogenation may be relied upon.

The content of the vinyl aromatic compound monomer unit in the hydrogenated copolymer can be controlled within the predetermined numeric range by adjusting the amount of the vinyl aromatic compound monomer added in the polymerization step.

The "stop mark" is a linear mark left on an adherend by deformation and breakage of the tacky layer that occur because of stress concentration on the peeling interface, which stress concentration is caused by leverage generated from bending of the surface protection film, in the case where the surface protection film is peeled off from the adherend and the peeling-off is stopped or the speed of the peeling-off is changed before the film is entirely peeled off.

The hydrogenated copolymer of the present embodiment may have a polymer block comprising a vinyl aromatic compound monomer unit as a main component (vinyl aromatic compound polymer block). Herein, the phrase "comprising as a main component" means that a vinyl aromatic compound monomer unit is contained in an amount of 60 mass % or more and preferably in an amount of 70 mass % or more in a polymer block.

The hydrogenated copolymer may also have a polymer block comprising a conjugated diene monomer unit as a main component (conjugated diene polymer block). Herein, the phrase "comprising as a main component" means that a conjugated diene monomer unit is contained in an amount of 96 mass % or more and preferably in an amount of 99 mass % or more in a polymer block.

The content of the vinyl aromatic compound polymer block in the hydrogenated copolymer of the present embodiment is preferably in the range of 3 to 40 mass %, more preferably in the range of 5 to 35 mass %, and even more preferably in the range of 7 to 30 mass %.

The surface protection film is also required not to contaminate the surface of the adherend, namely, a portion of the tacky layer, or low-molecular-weight compounds such as antioxidants or powders (outer lubricants), which are contained in the tacky layer, when the surface protection film is peeled off, does not migrate to the surface of the adherend. When the content of the vinyl aromatic compound polymer block in the hydrogenated copolymer is 40 mass % or less, the adhesion becomes good. In contrast, when the content is 3 mass % or more, there is a tendency that the tack strength does not increase excessively, defective molding and increase in tackiness caused by fusion among pellets comprising the hydrogenated copolymer, an adhesive residue, and occurrence of a stop mark are suppressed, and easy peelability between tacky surfaces becomes good.

The content of the vinyl aromatic compound polymer block in the hydrogenated copolymer is obtained by dividing the weight of the vinyl aromatic compound polymer block obtained by oxidatively decomposing the copolymer before hydrogenation by tert-butyl hydroperoxide using osmium tetroxide as the catalyst, by the weight of the copolymer before hydrogenation (the method described in I. M. Kolthoff, et al., J. Polym. Sci. 1, 429 (1946). Hereinafter, also referred to as "the osmium tetroxide oxidation method").

However, vinyl aromatic compound polymers having an average degree of polymerization of 30 or less are removed in the processes of the oxidative decomposition and weight measurement.

In the hydrogenated copolymer of the present embodiment, the mass ratio of the vinyl aromatic compound monomer unit to the conjugated diene monomer unit contained in the copolymer block A of the vinyl aromatic compound monomer unit and the conjugated diene monomer unit is preferably in the range of vinyl aromatic compound monomer unit/conjugated diene monomer unit=5/95 to 40/60, more preferably in the range of 7/93 to 37/63, and even more preferably in the range of 10/90 to 35/65.

When the mass ratio of the vinyl aromatic compound polymer unit to the conjugated diene monomer unit in the copolymer block A is within the range of vinyl aromatic compound monomer unit/conjugated diene monomer unit=5/95 to 40/60, increase in tackiness is suppressed, high tack strength can be maintained, and easy peelability between tacky surfaces becomes good.

The copolymer block A may contain the vinyl aromatic compound monomer unit and the conjugated diene monomer unit randomly or in a tapered manner.

The mass ratio of the vinyl aromatic compound monomer unit to the conjugated diene monomer unit contained in the copolymer block A can be controlled by adjusting the amount of the monomers added in the production step of the hydrogenated copolymer.

The amount of vinyl bonds of the conjugated diene monomer unit before hydrogenation in the hydrogenated copolymer of the present embodiment is preferably 50% or more, more preferably 55% or more, and even more preferably 60% or more.

Although the upper limit of the amount of vinyl bonds is not particularly limited, the amount is preferably 95% or less, more preferably 90% or less, and even more preferably 85% or less.

The amount of vinyl bonds of the conjugated diene monomer unit before hydrogenation means the proportion (%) of conjugated diene monomer units incorporated as 1,2-bonds and 3,4-bonds among conjugated diene monomer units incorporated as 1,2-bonds, 3,4-bonds, and 1,4-bonds in the block copolymer.

When the amount of vinyl bonds of the conjugated diene monomer unit before hydrogenation in the hydrogenated copolymer is 50% or more, the polymer has excellent adhesion and can exhibit practically effective tackiness.

The amount of vinyl bonds before hydrogenation in the hydrogenated copolymer can be controlled by using a Lewis base, for example, a compound such as an ether and amine as a vinylating agent and adjusting its amount of use and the polymerization temperature, or the like, and can be measured by nuclear magnetic resonance spectrum analysis (NMR) or the like. Specifically, the amount of vinyl bonds can be measured by the method described in the Examples below.

In the hydrogenated copolymer of the present embodiment, the degree of hydrogenation of double bonds based on the conjugated diene monomer unit in the hydrogenated copolymer is preferably 85% or more, more preferably 88% or more, and even more preferably 90% or more.

When the degree of hydrogenation is 85% or more, increase in tackiness can be suppressed, easy peelability between tacky surfaces becomes good, degradation on molding also can be suppressed, and gelling can be suppressed.

The degree of hydrogenation can be controlled by adjusting the amount of catalyst and the amount of hydrogen to be fed during hydrogenation, for example. The hydrogenation speed can be controlled by adjusting the amount of catalyst, the amount of hydrogen to be fed, the pressure and temperature and the like during hydrogenation, for example.

The degree of hydrogenation can be measured by the method described in the Examples below.

Although the structure of the hydrogenated copolymer of the present embodiment is not particularly limited, examples thereof include ones having a structure represented by the following formulae.

A, $(B-A)_n$, $B-(A-B)_n$, $A-(B-A)_n$, $[(A-B)_n]_m-X$, $[(B-A)_n]_m-X$, $[(A-B)_n-A]_m-X$, $[(B-A)_n-B]_m-X$, $(A-B)_n-X-(B)_p$, $(C-A)_n$, $C-(A-C)_n$, $A-(C-A)_n$, $[(C-A)_n]_m-X$, $[(A-C)_n-A]_m-X$, $[(C-A)_n-C]_m-X$, $C-(A-B)_n$, $C-(B-A)_n$, $C-(B-A-B)_n$, $C-(A-B-A)_n$, $B-C-(A-B)_n$, $B-C-(B-A)_n$, $B-C-(A-B)_n-C$, $[(B-A-C)_n]_m-X$, $[B-(A-C)_n]_m-X$, $[(B-A)_n-C]_m-X$, $[(B-A-B)_n-C]_m-X$, $[(A-B-A)_n-C]_m-X$, $[(C-A-B)_n]_m-X$, $[C-(A-B)_n]_m-X$, $[C-(B-A-B)_n]_m-X$, $[C-(A-B-A)_n]_m-X$

Wherein, A is a copolymer of a conjugated diene monomer unit and a vinyl aromatic compound monomer unit or a copolymer block of a conjugated diene monomer unit and a vinyl aromatic compound monomer unit (block A), B is a vinyl aromatic compound polymer block (block B), and C is a conjugated diene polymer block (block C).

It is not necessarily required that the boundary between the blocks is clearly distinguishable.

m is an integer of 2 or greater and preferably an integer of 2 to 10, and n and p are each an integer of 1 or greater and preferably an integer of 1 to 10.

X represents a residue of a coupling agent or a polyfunctional initiator residue.

In the general formulae, vinyl aromatic hydrocarbons in the copolymer block A may be uniformly distributed or may be distributed in a tapered manner. The copolymer or the copolymer block A may have a plurality of portions where the vinyl aromatic compound is uniformly distributed or a plurality of portions where the vinyl aromatic compound is distributed in a tapered manner. The copolymer block A may have a plurality of segments having different contents of the vinyl aromatic compound. When there are a plurality of blocks A and a plurality of blocks B in the copolymer, their structures such as molecular weights and compositions may be the same or different.

The structures of polymer chains bonded to X may be the same or different.

The structure of the hydrogenated copolymer of the present embodiment is particularly preferably $B-(A-B)_n$, $(B-A)_n$, $[(B-A)_n]_m-X$, or $C-(B-A-B)_n$. With these structures, there is a tendency that defective molding and increase in tackiness caused by fusion among pellets comprising the hydrogenated copolymer, an adhesive residue, and occurrence of a stop mark are suppressed.

The hydrogenated copolymer of the present embodiment has a weight average molecular weight (Mw) (hereinafter, also referred to as "Mw") preferably in the range of 50,000 to 200,000, more preferably in the range of 70,000 to 190,000, and even more preferably in the range of 90,000 to 180,000.

When the Mw is 50,000 or more, the fabricability is excellent, an adhesive residue and occurrence of a stop mark are suppressed, and the easy peelability between tacky surfaces becomes good. In contrast, when the Mw is 200,000 or less, the adhesion and tackiness are excellent.

The weight average molecular weight (Mw) of the hydrogenated copolymer is a weight average molecular weight (Mw) calculated from the molecular weights of peaks of a chromatograph obtained by gel permeation chromatography (hereinafter, also referred to as "GPC") measurement based on a calibration curve obtained by measurement on commercially available standard polystyrene (formed by the peak molecular weight of standard polystyrene).

The melt flow rate (hereinafter, also referred to as "MFR", in accordance with ISO 1133) of the hydrogenated copolymer in the present embodiment is preferably in the range of 1 to 50 g/10 min, more preferably in the range of 3 to 45 g/10 min, even more preferably in the range of 5 to 40 g/10 min, and still even more preferably in the range of 5 to 20 g/10 min at a temperature of 230° C. under a load of 2.16 kg.

When the melt flow rate is 50 g/10 min or less, the tack strength does not increase excessively, defective molding and increase in tackiness caused by fusion among pellets comprising the hydrogenated copolymer, an adhesive residue, and occurrence of a stop mark are suppressed, and easy peelability between tacky surfaces becomes better. In contrast, when the melt flow rate is 1 g/10 min or more, the fabricability is excellent, and the adhesion and tack strength become good.

The melt flow rate of the hydrogenated copolymer can be controlled by adjusting the polymerization conditions such as the amount of monomer added, polymerization time, temperature, and polymerization initiator and can be measured by a method described in Examples described below.

The hydrogenated copolymer of the present embodiment has a tan δ peak, which is obtained by subjecting the hydrogenated polymer to dynamic viscoelasticity measurement (1 Hz), in the range of −40° C. to 20° C., the value of the tan δ peak of 0.8 or more, and the half value width of the tan δ peak of 22° C. or less.

The tan δ peak is preferably in the range of −35° C. to 15° C. and more preferably in the range of −30° C. to 10° C.

When the tan δ peak is in the range of 20° C. or less, the adhesion and tack strength are excellent.

In contrast, when the tan δ peak is −40° C. or more, there is a tendency that easy peelability between tacky surfaces becomes good and increase in tackiness, an adhesive residue, and occurrence of a stop mark are suppressed.

The value of the tan δ peak is preferably 1.0 or more and more preferably 1.2 or more. Although the upper limit of the value of the tan δ peak is not particularly limited, the value is preferably 3.0 or less.

When the tan δ peak value is 0.8 or more, easy peelability between tacky surfaces becomes good, increase in tackiness, an adhesive residue, and occurrence of a stop mark can be suppressed, and tack strength becomes good.

The half value width of the tan δ peak is preferably 20° C. or less and more preferably 18° C. or less. Although the lower limit of the half value width of the tan δ peak is not particularly limited, the half value with is preferably 8° C. or more. When the half value width of the tan δ peak is 22° C. or less, easy peelability between tacky surfaces becomes good, increase in tackiness, an adhesive residue, and occurrence of a stop mark can be suppressed.

The tan δ peak temperature can be controlled by adjusting the content of the vinyl aromatic monomer unit in the copolymer block A, the amount of vinyl bonds before hydrogenation, and the degree of hydrogenation.

The content of the vinyl aromatic monomer unit in the copolymer block A can be controlled by adjusting the amount of the monomer added in the production step for the hydrogenated copolymer.

When the amount of vinyl aromatic monomer unit in the copolymer block A is increased, the tan δ peak temperature tends to rise, and when the amount is decreased, the temperature tends to decline.

The amount of vinyl bonds before hydrogenation can be controlled by using a Lewis base, for example, a vinylating agent such as an ether and an amine and adjusting its amount of use and the polymerization temperature.

When the amount of vinyl bonds before hydrogenation is 50% or more, the tan δ peak temperature tends to rise as the amount of vinyl bonds before hydrogenation is increased, and the temperature tends to decline as the amount is decreased.

The degree of hydrogenation can be controlled by adjusting the amount of the catalyst and the amount of hydrogen to be fed during hydrogenation, for example. When the degree of hydrogenation is increased, the tan δ peak temperature tends to decline, and when the degree is decreased, the temperature tends to rise.

The tan δ peak value and the half value width can be controlled within the range described above by adjusting the temperature when the copolymer block A is polymerized. When the polymerization temperature is adjusted to high, the tan δ peak value tends to rise. The half value width tends to be narrower by adjusting the polymerization temperature to high and controlling the polymerization temperature within the range described below.

[Method for Producing Hydrogenated Copolymer]

The hydrogenated copolymer of the present embodiment can be produced by carrying out polymerization in an organic solvent, for example, with an organic alkali metal compound as the polymerization initiator to obtain a copolymer and then subjecting the copolymer to hydrogenation.

The polymerization form may be batch polymerization or continuous polymerization, or may be a combination thereof. From the viewpoint of obtaining a copolymer having a narrow molecular weight distribution, a batch polymerization method is preferred.

The polymerization temperature is generally 0 to 150° C., preferably 20 to 120° C., more preferably 40 to 100° C., and even more preferably 40 to 80° C.

The temperature for polymerization of the copolymer block A comprising a vinyl aromatic compound monomer unit and a conjugated diene monomer unit is preferably 40 to 70° C. and more preferably 50 to 65° C., from the viewpoint of uniformly randomizing the vinyl aromatic compound monomer unit and the conjugated diene monomer unit in the copolymer block A, controlling the amount of vinyl bonds of each polymer block constituting the copolymer within the range described above, and controlling the temperature range in which the tan δ peak is located, the tan δ peak value, and the half value width.

From the viewpoint of uniformly randomizing the vinyl aromatic compound monomer unit and the conjugated diene monomer unit in the copolymer block A, equalizing the amount of vinyl of the polymer blocks constituting the copolymer, and controlling the half value width of the tan δ peak, the temperature difference between the polymerization temperatures when the copolymer block A is formed is preferably 20° C. or less, more preferably 15° C. or less, and even more preferably 10° C. or less. The "temperature difference between the polymerization temperatures" means the difference between the highest value and the lowest value of the polymerization temperature when the copolymer block A is formed.

The polymerization time depends on the polymer intended, and is usually with 24 hours and preferably 0.1 to 10 hours. From the viewpoint of obtaining a block copolymer having a narrow molecular weight distribution and high strength, the polymerization time is more preferably 0.5 to 3 hours.

The atmosphere of the polymerization system, which is not particularly limited, is only required to be in a pressure range sufficient maintaining nitrogen and the solvent in a liquid phase.

The polymerization system preferably includes no impurities such as water, oxygen and carbon dioxide, which may deactivate the polymerization initiator and the living polymer.

Examples of the organic solvent include, but are not particularly limited to, aliphatic hydrocarbons, such as n-butane, isobutane, n-pentane, n-hexane, n-heptane, and n-octane; alicyclic hydrocarbons, such as cyclohexane, cycloheptane, and methylcyclopentane; and aromatic hydrocarbons, such as benzene, xylene, toluene, and ethylbenzene.

The organic alkali metal compound as the polymerization initiator is preferably an organic lithium compound.

As the organic lithium compound, organic monolithium compounds, organic dilithium compounds, and organic polylithium compounds can be used. Examples of the organic lithium compound include, but are not limited to, ethyllithium, n-propyllithium, isopropyllithium, n-butyllithium, sec-butyllithium, t-butyllithium, phenyllithium, hexametylenedilithium, butadienyllithium, and isopropenyldilithium. Of these, from the viewpoint of polymerization activity, n-butyllithium and sec-butyllithium are preferred.

The amount of the organic alkali metal compound used as the polymerization initiator depends on the molecular weight of the polymer intended, and is generally in the range of 0.01 to 0.5 phm (parts by mass per 100 parts by mass of the monomer), preferably in the range of 0.03 to 0.3 phm, and more preferably in the range of 0.05 to 0.15 phm.

The amount of vinyl bonds before hydrogenation in the hydrogenated copolymer can be controlled by using a Lewis base, for example, a compound such as an ether and amine as a vinylating agent. The amount of the vinylating agent used is adjusted in accordance with the amount of vinyl bonds intended. Alternatively, adding the vinylating agent and a metal alkoxide described below separately under two or more conditions can produce a polymer block having a different amount of vinyl bonds in a polymer block comprising a conjugated diene compound as a main component.

Examples of the vinylating agent include, but are not limited to, ether compounds, etheric compounds having two or more oxygen atoms, and tertiary amine compounds.

Examples of the tertiary amine compound include, but are not limited to, pyridine, N,N,N',N'-tetramethylethylenediamine, tributylamine, tetramethylpropanediamine, 1,2-dipiperidinoethane, and bis[2-(N,N-dimethylamino)ethyl]ether.

Only one of these may be used singly, and two or more of these may be used in combination.

Preferable tertiary amine compounds are compounds having two amines. Furthermore, of these, compounds having a structure showing symmetry in the molecule are more preferable, and N,N,N',N'-tetramethylethylenediamine, bis[2-(N,N-dimethylamino)ethyl]ether, and 1,2-dipiperidinoethane are even more preferable.

In the production step for the hydrogenated copolymer of the present embodiment, polymerization may be performed under coexistence of the aforementioned vinylating agent, organic lithium compound, and alkali metal alkoxide. The alkali metal alkoxide herein is a compound represented by the general formula MOR, wherein M is an alkali metal, and R is an alkyl group.

The alkali metal of the alkali metal alkoxide is preferably sodium or potassium from the viewpoint of a high amount of vinyl bond, a narrow molecular weight distribution, a high polymerization speed, and a high block ratio.

The alkali metal alkoxide is, but are not limited to, preferably a sodium alkoxide, lithium alkoxide, or potassium alkoxide having an alkyl group having 2 to 12 carbon atoms, more preferably a sodium alkoxide or potassium alkoxide having an alkyl group having 3 to 6 carbon atoms, and even more preferably sodium-t-butoxide, sodium-t-pentoxide, potassium-t-butoxide, or potassium-t-pentoxide.

Of these, sodium alkoxides such as sodium-t-butoxide and sodium-t-pentoxide are still even more preferable.

In the production step of the hydrogenated copolymer of the present embodiment, when polymerization is performed under coexistence of a vinylating agent, an organic lithium compound, and an alkali metal alkoxide, the components preferably coexist in the molar ratio of the vinylating agent to the organic lithium compound (vinylating agent/organic lithium compound) and the molar ratio of the alkali metal alkoxide to the organic lithium compound (alkali metal alkoxide/organic lithium compound) described below:

vinylating agent/organic lithium compound: 0.2 to less than 3.0 alkali metal alkoxide/organic lithium compound: 0.3 or less

The molar ratio of vinylating agent/organic lithium compound is preferably 0.2 or more from the viewpoint of the uniform randomization, high amount of vinyl bonds, and high polymerization speed of the copolymer block A, and is preferably less than 3.0 from the viewpoint of obtaining a narrow molecular weight distribution and high hydrogenation activity. The molar ratio of alkali metal alkoxide/organic lithium compound is preferably 0.3 or less from the viewpoint of obtaining a narrow molecular weight distribution and high hydrogenation activity. This leads to an improvement in the polymerization speed, and there is a tendency that the copolymer block A of the hydrogenated copolymer intended can be uniformly randomized, the amount of vinyl bonds can be increased, and the molecular weight distribution can be narrowed. As a result, the adhesion and tack strength are excellent, there is a tendency that increase in tackiness, an adhesive residue, and occurrence of a stop mark can be suppressed and the easy peelability between tacky surfaces becomes better.

The molar ratio of vinylating agent/organic lithium compound in the polymerization step is more preferably 0.5 or more from the viewpoint of the uniform randomization, high amount of vinyl bonds, and high polymerization speed of the of copolymer block A and is preferably 2.5 or less from the viewpoint of the narrow molecular weight distribution and high hydrogenation activity and more preferably 0.8 or more and 2.0 or less.

The molar ratio of alkali metal alkoxide/organic lithium compound is more preferably 0.2 or less, even more preferably 0.1 or less, and even more preferably 0.08 or less from the viewpoint of the narrow molecular weight distribution and high hydrogenation activity.

Furthermore, the molar ratio of alkali metal alkoxide/vinylating agent is more preferably 0.1 or less, even more preferably 0.08 or less, still even more preferably 0.06 or less, still even more preferably 0.05 or less from the viewpoint of achieving a narrow molecular weight distribution and obtaining high hydrogenation activity.

When a polymer block comprising a conjugated diene compound as a main component is contained in the hydrogenated copolymer of the present embodiment, an example of an approach to produce a block having a different amount of vinyl bonds in the polymer comprising the conjugated diene compound as a main component is a method including use of a deactivator for the vinylating agent.

Examples of the deactivator include, but are not limited to, alkyl metal compounds, and the deactivator is selected from alkyl aluminum, alkyl zinc, and alkyl magnesium having 1 to 20 carbon atoms per alkyl substituent, and mixtures thereof.

In the production step of the hydrogenated copolymer of the present embodiment, the hydrogenation method is not particularly limited. For example, hydrogenating a copolymer obtained as described above by supplying hydrogen in the presence of a hydrogenation catalyst can provide a hydrogenated copolymer in which the double bond residues of the conjugated diene compound unit have been hydrogenated.

Additionally, pelletizing the hydrogenated copolymer obtained as described above can produce pellets of the hydrogenated copolymer.

Examples the pelletizing method include a method including extruding the hydrogenated copolymer in a strand form from a single screw or twin screw extruder and cutting the extruded product in water with a rotary blade installed at the front face of a die portion; a method including extruding the hydrogenated copolymer in a strand form from a single screw or twin screw extruder and cutting the extruded product with a strand cutter after water cooling or air cooling; and a method including shaping the hydrogenated copolymer into a sheet form with a roll after melt blending with an open roll and a Banbury mixer, further, cutting the sheet into strips, and thereafter cutting the strips into cuboidal pellets with a pelletizer.

It is to be noted that the size and shape of a pellet molded article of the hydrogenated copolymer are not particularly limited.

An antiblocking agent for pellets can be blended as necessary in the hydrogenated copolymer of the present embodiment in the pellet thereof, as required, in order to prevent blocking of pellets.

Examples of the antiblocking agent for pellets include, but not limited to, calcium stearate, magnesium stearate, zinc stearate, polyethylene, polypropylene, ethylenebis(stearylamide), talc, and amorphous silica.

From the viewpoint of the tackiness and adhesive residue of surface protection films obtained by molding the hydrogenated copolymer, polyethylene and ethylenebis(stearylamide) are preferable.

The amount of the antiblocking agent for pellets blended is preferably 500 to 10,000 ppm with respect to the hydrogenated copolymer and more preferably 1,000 to 7,000 ppm with respect to the hydrogenated copolymer. Although the antiblocking agent for pellets is preferably blended while being attached to the surface of the pellets, the agent may be contained inside the pellets to some extent.

[Composition]

The composition of the present embodiment comprises the hydrogenated copolymer of the present embodiment.

The composition of the present embodiment may comprise a tackifier resin.

The tackifier resin is not particularly limited as long as it is a resin that is capable of imparting viscosity to the composition of the present embodiment, and examples include known tackifier resins such as rosin terpene resins, hydrogenated rosin terpene resins, cumarone resins, terpene resins, hydrogenated terpene resins, phenol resins, terpene-phenol resins, aromatic hydrocarbon resins, and aliphatic hydrocarbon resins.

Only one tackifier resin may be used singly, or two or more these may be used as a mixture.

Specific examples of usable tackifier resins are those described in "Chemicals for Rubber/Plastics" (by Rubber Digest, Co., Ltd., Japan). Use of a tackifier resin can improve the tack strength.

The content of the tackifier resin in the composition of the present embodiment is preferably 100 parts by mass or less, more preferably 80 parts by mass or less, and even more preferably 60 parts by mass or less, based on the total mass of the hydrogenated copolymer being 100 parts by mass.

When the tackifier resin content is 100 parts by mass or less, there is a tendency that increase in tackiness can be effectively prevented and an adhesive residue and occurrence of a stop mark on peeling-off can be more effectively suppressed, and therefore such a tackifier resin content is preferable.

The composition of the present embodiment may further comprise a hydrogenated styrenic elastomer having a structure different from that of the above-described hydrogenated copolymer of the present embodiment.

The hydrogenated styrenic elastomer is not limited to the following, and examples of typical hydrogenated styrenic elastomers include styrene-butadiene-styrene (SBS), styrene-ethylene-butylene-styrene (SEBS) obtained by saturating styrene-isoprene-styrene by hydrogenation, and styrene-ethylene-propylene-styrene (SEPS).

Additional examples include elastomers of such a structure as styrene-ethylene-butylene (SEB) or styrene-ethylene-propylene (SEP).

Moreover, reactive elastomers may be used, which are obtained by adding a variety of functional groups to the above hydrogenated styrenic elastomers.

Examples of the functional group include, but are not limited to, a hydroxyl group, a carboxyl group, a carbonyl group, a thiocarbonyl group, an acid halide group, an acid anhydride group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxy silicon group, a tin halide group, a boronic acid group, a boron-containing group, a boronic acid salt group, an alkoxy tin group, and a phenyl tin group.

The composition of the present embodiment may further comprise an ethylene vinyl acetate copolymer.

The ethylene vinyl acetate copolymer can be produced, for example, by subjecting ethylene and vinyl acetate to radical copolymerization under high-temperature, high-pressure conditions, but the production method is not particularly limited. Although the properties of the ethylene vinyl acetate copolymer depend on the vinyl acetate content, the vinyl acetate content is not particularly limited.

The composition of the present embodiment may further comprise an acrylic copolymer.

Examples of the acrylic copolymer include, but are not particularly limited to, copolymers of methyl acrylate, ethyl acrylate, methyl methacrylate, acrylnitrile, and the like with vinyl acetate, vinyl chloride, styrene, and the like.

The composition of the present embodiment may further comprise a softening agent.

Examples of the softening agent include, but are not limited to, mineral-oil softening agents and synthetic-resin softening agents.

In general, examples of mineral-oil softening agents include mixtures of aromatic hydrocarbons, naphthenic hydrocarbons, and paraffinic hydrocarbons. Oils in which carbon atoms of paraffinic hydrocarbons account for 50% or more of all carbon atoms are referred to as paraffinic oils, oils in which carbon atoms of naphthenic hydrocarbons account for 30 to 45% are referred to as naphthenic oils, and oils in which carbon atoms of aromatic hydrocarbons account for 35% or more are referred to as aromatic oils.

Paraffinic oils, which are softening agents for rubbers, are preferable as mineral-oil softening agents, and polybutene, low molecular weight polybutadiene, and the like are preferable as synthetic-resin softening agents.

When a softening agent is contained, the composition of the present embodiment tends to have more improved tackiness.

From the viewpoint of suppressing the bleeding of a softening agent and ensuring practically sufficient tack strength in the composition of the present embodiment, the softening agent content in the composition of the present embodiment is preferably 100 parts by mass or less and more preferably 80 parts by mass or less based on the mass of the hydrogenated copolymer of the present embodiment being 100 parts by mass.

Furthermore, a stabilizer such as an antioxidant, a light stabilizer, or the like may be added to the composition of the present embodiment.

Examples of the antioxidant include, but are not limited to, hindered phenol antioxidants such as 2,6-di-t-butyl-4-methylphenol, n-octadecyl-3-(4'-hydroxy-3',5'-di-t-butylphenyl)propionate, 2,2'-methylenebis(4-methyl-6-t-butylphenol), 2,2'-methylenebis(4-ethyl-6-t-butylphenol), 2,4-bis[(octylthio)methyl]-o-cresol, 2-t-butyl-6-(3-t-butyl-2-hydroxy-5-methylbenzyl)-4-methylphenyl acrylate, 2,4-di-t-amyl-6-[1-(3,5-di-t-amyl-2-hydroxyphenyl)ethyl]phenyl acrylate, and 2-[1-(2-hydroxy-3,5-di-tert-pentylphenyl)] acrylate; sulfur antioxidants such as dilauryl thiodipropionate and lauryl stearyl thiodipropionate pentaerythritoltetrakis(β-lauryl thiopropionate); and phosphorus antioxidants such as tris(nonylphenyl) phosphite and tris(2,4-di-t-butylphenyl) phosphite.

Examples of the light stabilizer include, but are not limited to, benzotriazole ultraviolet absorbers such as 2-(2'-hydroxy-5'-methylphenyl)benzotriazole, 2-(2'-hydroxy-3',5'-t-butylphenyl)benzotriazole, and 2-(2'-hydroxy-3',5'-di-t-butylphenyl)-5-chlorobenzotriazole; benzophenone ultraviolet absorbers such as 2-hydroxy-4-methoxybenzophenone; and hindered amine light stabilizers.

In addition to the above-described various materials, various additives may be added to the composition of the present embodiment as necessary.

Examples of such additives include, but are not limited to, pigments such as iron red and titanium dioxide; waxes such as paraffin wax, microcrystalline wax, and low molecular weight polyethylene wax; polyolefin or low molecular weight vinylaromatic thermoplastic resins such as amorphous polyolefin and ethylene-ethyl acrylate copolymers; natural rubbers; and synthetic rubbers such as polyisoprene rubber, polybutadiene rubber, styrene-butadiene rubber, ethylene-propylene rubber, chloroprene rubber, acrylic rubber, isoprene-isobutylene rubber, and polypentenamer rubber.

Specific examples of the synthetic rubbers include those described in "Chemicals for Rubber/Plastics" (by Rubber Digest, Co., Ltd., Japan) and the like.

(Production Method for Composition)

The method for producing the composition of the present embodiment is not particularly limited, and the composition can be produced by conventionally known methods.

Examples of the method include melt kneading methods involving a commonly used mixer such as a Banbury mixer, a single screw extruder, a twin screw extruder, a co-kneader, or a multiscrew extruder; methods in which components are dissolved or dispersion-mixed, then applied to a predetermined substrate film with a coater or the like, and heated to remove the solvent; and similar methods.

Foaming treatment may be performed on the composition of the present embodiment to reduce weight, provide flexibility, and improve adhesion.

Examples of foaming treatment methods include, but are not limited to, chemical methods, physical methods, the use of thermally expandable microballoons, and the like. Such methods can each distribute voids in a material, for example, by adding a chemical blowing agent, such as an inorganic blowing agent or an organic blowing agent, or a physical blowing agent or by adding thermally expandable microballoons. Moreover, a hollow filler (expanded balloons) may also be added to reduce weight, provide flexibility, and improve adhesion.

[Molded Article]

The molded article of the present embodiment comprises the hydrogenated copolymer of the present embodiment.

Examples of the molded article include, but are not limited to, automotive parts (automotive interior materials and automotive exterior materials), various containers such as food packaging containers, consumer electrical appliances, medical device parts, industrial parts, toys, and tackiness films, for example, surface protection films.

The molded article of the present embodiment can be molded by softening or melting with heat. The molded article can be produced by using conventional molding techniques including, but not limited to, compression molding, injection molding, gas-assisted injection molding, hollow molding, sheet forming, rotational molding, laminating, calendering, vacuum forming, thermoforming or hot forming, and extrusion. Only one of these molding techniques may be used singly, and two or more of techniques may be used in combination.

[Surface Protection Film]

The surface protection film of the present embodiment comprises the hydrogenated copolymer of the present embodiment and may comprise the composition of the present embodiment aforementioned.

The surface protection film of the present embodiment is preferably configured to include a tacky adhesive layer formed by laminating the hydrogenated copolymer and the composition described in the above embodiment, on a predetermined substrate film.

The material of the substrate film are not particularly limited, and any non-polar resins and polar resins can be used. In terms of performance, cost, etc., polyethylene and homo- or block-polypropylene are preferable non-polar resins, and polyester resins such as polyethylene terephthalate and polybutylene terephthalate, polyamide resins, ethylene-vinylacetate copolymers, hydrolysates thereof, and the like are preferable polar resins.

When the surface protection film of the present embodiment is configured to include a tacky adhesive layer on a predetermined substrate film, the thickness of the tacky adhesive layer is preferably 1.0 μm or more and 100 μm or less and more preferably 5.0 μm or more and 100 μm or less.

When the thickness of the tacky adhesive layer is 100 μm or less, the surface protection film tends to have better handleability, and is economically preferable as well. Moreover, when the thickness is 1 μm or more, there is a tendency that the surface protection film has better adhesion and uniform thickness is likely to be obtained.

The thickness of the substrate film is preferably 5.0 mm or less, more preferably 3.0 mm or less, even more preferably 1.0 mm or less, even more preferably 300 μm or less, and yet more preferably 10 μm or more and 200 μm or less. Although a film having a thickness of more than 300 μm is generally referred to as a "sheet", such a sheet is collectively referred to as a film herein.

(Production Method for Surface Protection Film)

Examples of the method for producing the surface protection film of the present embodiment include, but are not limited to, a method in which a solution or a melt of the hydrogenated copolymer or composition of the present embodiment is applied onto the predetermined substrate film, a method including coextruding a substrate layer and a tacky adhesive layer using a film extruder, and the like.

Here, in the case of using the composition of the present embodiment, a solution or melt of the composition may be used singly, or a solution or melt of the hydrogenated copolymer may be mixed thereto.

Although the method in which a solution the hydrogenated copolymer or composition of the present embodiment is applied is not limited to the following, the surface protection film can be produced, for example, by dissolving the copolymer or composition in a solvent capable of dissolving these, applying the solution to a substrate film with a coater or the like, and thermally drying the solvent.

Although the method in which the hydrogenated copolymer or composition of the present embodiment is melted and applied is not limited to the following, the surface protection film can be produced, for example, by applying the molten hydrogenated copolymer or composition of the present embodiment onto a substrate film with a hot melt coater or the like.

In the case of using this method, substrate films are preferably used that have a higher glass transition temperature, melting point, or softening point than the coating temperature.

Although the method in which a film extruder is used is not limited to the following, the surface protection film can be produced, for example, in such a manner that the components of the adhesive layer containing the hydrogenated copolymer or composition of the present embodiment and the components such as a thermoplastic resin that can constitute the substrate film layer are formed into two streams in a melt coextruder, or that is to say, a fluid for forming the tacky adhesive layer and a fluid for forming the substrate film are merged in a dice port and formed into a single fluid and extruded to combine the tacky adhesive layer and the resin film layer.

In the case of applying the method in which a film extruder is used, the composition of the present embodiment can be produced also by dry-blending the components of the hydrogenated copolymer and composition in advance. Thus, the method is excellent in productivity. Moreover, when the surface protection film is produced by extrusion molding, the surface protection film tends to have particularly remarkable adhesion and tackiness.

EXAMPLES

Below, the present embodiment will now be described in detail by way of specific Examples and Comparative Examples, but the present embodiment is not limited to the Examples below.

The methods for measuring and evaluating physical properties applied to the Examples and the Comparative Examples will now be described below.

[Measurement Methods and Evaluation Methods]

((1) Content of Vinyl Aromatic Compound Monomer Unit of Hydrogenated Copolymer (Hereinafter, Also Noted as Styrene Content), Amount of Vinyl Bonds of Conjugated Diene Monomer Unit Before Hydrogenation, and Degree of Hydrogenation of Double Bonds Based on Conjugated Diene Monomer Unit)

The styrene content in a polymer, the amount of vinyl bonds of a conjugated diene monomer unit before hydrogenation, and the degree of hydrogenation of double bonds based on the conjugated diene monomer unit were measured and determined by nuclear magnetic resonance spectrum analysis (NMR) under the following conditions.

Measurement instrument: JNM-LA400 (manufactured by JEOL Ltd.)

Solvent: Deuterated chloroform

Measuring samples: Polymer sampled before or after hydrogenation

Sample concentration: 50 mg/mL

Observation frequency: 400 MHz

Chemical shift reference: TMS (tetramethylsilane)

Pulse delay: 2.904 seconds

Number of scans: 64

Pulse width: 45°

Measurement temperature: 26° C.

((2) Content of Styrene Block (Block B) of Hydrogenated Copolymer)

Using a copolymer before hydrogenation, decomposition and measurement were performed by the osmium tetroxide oxidation method described in I. M. Kolthoff, et al., J. Polym. Sci., 1, p. 429 (1946).

A 0.1 g osmic acid/125 mL tert-butanol solution was used for the decomposition of the copolymer.

((3) Weight Average Molecular Weight of Hydrogenated Copolymer)

Gel permeation chromatography (GPC) was performed under the following conditions to determine the weight average molecular weight of the hydrogenated copolymer from the molecular weights at the resulting peaks in reference to a calibration curve in terms of polystyrene (PS).

Measurement apparatus: GPC HLC-8220 (manufactured by Tosoh Corporation, trade name)

Columns: One TAKgelGMHXL SuperH5000 column: Two SuperH4000 columns (manufactured by Tosoh Corporation, trade names)

Solvent: Tetrahydrofuran

Temperature: 40° C.

Calibration curve sample: Commercially available standard sample (manufactured by Tosoh Corporation), ten-point measurement ((4) MFR (Melt Flow Rate) of Hydrogenated Copolymer)

The MRF of the hydrogenated copolymer was measured in accordance with ISO 1133 at a temperature of 230° C. under a load of 2.16 kg.

((5) Dynamic Viscoelasticity Measurement of Hydrogenated Copolymer)

A measuring sample was placed in the twist-type geometry of an ARES apparatus (manufactured by TA Instruments, trade name) and a dynamic viscoelasticity spectrum was measured under the following conditions to obtain the peak height of the loss coefficient tan δ (maximum value), the temperature at which the maximum value is given (temperature at which the tan δ peak is located), and the peak half value width.

Measurement sample size: 2.0 mm thick, 12.6 mm wide, 40 mm long

Effective measurement length: 22 mm

Strain: 0.5%

Frequency: 1 Hz

Measurement temperature range: −100 to 150° C.

Heating rate: 3° C./min ((6) Easy Peelability Between Tacky Surfaces of Surface Protection Films)

The substrate layer side of the surface protection film prepared each in the Examples 1 to 26 and the Comparative Examples 1 to 3 below was attached to a PMMA plate (polymethyl methacrylate plate, arithmetic mean surface roughness: 1.1 μm) with double-sided tape, and onto the tacky layer side of the film, the tacky layer side of another surface protection film was adhered by rolling a 2 kg rubber roller (a diameter of 10 cm) at 23° C.×50% RH. Then, the film was heated at 60° C. for 30 minutes in a gear oven for tack promotion and left to stand for 30 minutes at a temperature of 23° C.×50% RH. Thereafter, the film was peeled off in the 180 degree direction and evaluated in accordance with the following criteria.

Evaluation results are shown in Tables 3 and 4 below.

◎: The film can be peeled off easily and are reusable with no failure of the tacky surfaces.

○: Some stress is required for peeling-off, but the film is reusable with no failure of the tacky surfaces.

×: Enormous stress is required for peeling-off and the film is not reusable with tacky surface failures.

((7) Adhesion of Surface Protection Film)

The surface protection film prepared each in the Examples 1 to 26 and the Comparative Examples 1 to 3 below was attached to a PMMA plate (polymethyl methacrylate plate, arithmetic mean surface roughness: 1.1 μm), adhered by rolling a 2 kg rubber roller (a diameter of 10 cm) at 23° C.×50% RH, and then visually observed in reference to the area ratio of adhered portions to pore portions as an indicator of adhesion and evaluated in accordance with the following criteria.

Evaluation results are shown in Tables 3 and 4 below.

◎: No visually observable voids over a peel area (1 $m^2$)

○: One visually observable void over a peel area (1 $m^2$)

×: Two or more visually observable voids over a peel area (1 $m^2$)

((8) Initial Tackiness, Increase in Tackiness)

A universal tension and compression tester "Techno Graph TGE-500N: manufactured by Minebea Co., Ltd." was used as a measurement apparatus for the tack strength.

Each in Examples 1 to 26 and Comparative Examples 1 to 3 below, the prepared surface protection film that had been cut to have a width of 25 mm was attached to a PMMA plate (arithmetic mean surface roughness: 0.1 μm) at 23° C.×50% RH, additionally adhered by rolling a 2 kg rubber roller (a diameter of 10 cm), left to stand for 30 minutes, and then peeled off at a rate of 300 mm/min to measure tack strength.

For evaluation, a "180° peel test" was performed at 23° C.×50% RH with respect to both initial tackiness and increase in tackiness.

Initial tack strength was measured for the initial tackiness, change over time in the tack strength when the film was adhered for a long period of time, that is, the tack strength after thermal tack promotion was measured for increase in tackiness under the condition described below, and both were evaluated in accordance with the following criteria.

Evaluation results of the initial tackiness and increase in tackiness are shown in Tables 3 and 4 below.

Initial tackiness
◎: Tack strength of 400 g/25 mm or more
○: Tack strength of 300 to less than 400 g/25 mm
x: Tack strength of 0 to less than 300 g/25 mm Increase in tackiness
◎: Tack strength of 1.5 times or less the initial tack strength
○: Tack strength of 2.0 times or less the initial tack strength
x: Tack strength of more than 2.0 times the initial tack strength For increase in tackiness, the surface protection film prepared each in Examples 1 to 26 and Comparative Examples 1 to 3 was attached in the above-described manner, then heated at 80° C. for 1 hour in a gear oven for tack promotion, and left to stand for 30 minutes in the measurement environment. Thereafter, the tack strength was measured in accordance with the above-described manner, and evaluation was performed.

The "180° peel test" was performed in accordance with the JIS 20237 standard.

((9) Stop Mark)

The surface protection film prepared each in the Examples and the Comparative Examples below was attached to a PMMA plate (arithmetic mean surface roughness: 1.1 μm), additionally adhered by rolling a 2 kg rubber roller (a diameter of 10 cm) at 23° C.×50% HR, then heated at 70° C. for 96 hours in a gear oven for tack promotion, and left to stand for 30 minutes in the measurement environment. Thereafter, the surface protection film was peeled off, and the peeling was once stopped at the center portion. Then, the film was entirely peeled off and illuminated with an LED light from the side of the PMMA plate, and the surface condition was evaluated in accordance with the following criteria.

◎: No stop mark is identified.
○: A stop mark can be slightly identified in the center portion.
x: A stop mark can be clearly identified in the center portion.

((10) Adhesive Residue)

The surface protection film prepared each in the Examples and the Comparative Examples below was attached to a PMMA plate (arithmetic mean surface roughness: 1.1 μm), additionally adhered by rolling a 2 kg rubber roller (a diameter of 10 cm) at 23° C.×50% HR, then heated at 80° C. for 1 hours in a gear oven for tack promotion, and left to stand for 30 minutes in the measurement environment. Thereafter, the surface protection film was peeled off, and the adhesive residue remaining on the PMMA plate was evaluated in accordance with the following criteria.

◎: No visually observable adhesive residue over a peel area (1 m$^2$).
○: One visually observable point of an adhesive residue over a peel area (1 m$^2$).
x: Two or more visually observable points of an adhesive residue over a peel area (1 m$^2$).

[Production of Hydrogenated Copolymer]
(Preparation of Hydrogenation Catalyst)

The hydrogenation catalyst used for the hydrogenation reaction of the block copolymer was prepared in the following manner.

A nitrogen-purged reaction vessel was charged with 1 liter of dried and purified cyclohexane, 100 mmol of bis(η5-cyclopentadienyl)titanium dichloride was added, and an n-hexane solution containing 200 mmol of trimethylaluminum was added with sufficient stirring, a reaction was performed at room temperature for about 3 days to prepare a hydrogenation catalyst.

(Production of Polymer)

A1, B1, B2, and C1 described below respectively represent the following polymer blocks.
A1: Random copolymer block of styrene and butadiene
B1, B2: Polystyrene polymer blocks
C1: Polybutadiene copolymer block Example 1

<Polymer 1: Hydrogenated Product of Styrene—Styrene/Butadiene Random—Styrene (B1-A1-B2)>

Batch polymerization was performed in the following manner with a stirred jacketed tank reactor having an internal volume of 10 L.

First, the reactor was charged with 1 L of cyclohexane, and the temperature was adjusted to 55° C. Then, 0.075 parts by mass of n-butyllithium (hereinafter referred to as "Bu-Li") was added per 100 parts by mass of the total amount of the butadiene monomer and the styrene monomer introduced into the reactor (hereinafter referred to as all the monomers), 1.5 mol of N,N,N',N'-tetramethylethylenediamine (hereinafter also referred to as TMEDA) was added per mol of Bu-Li, and 0.04 mol of sodium t-pentoxide (hereinafter also referred to as NaOAm) was added per mol of Bu-Li.

As a first step, a cyclohexane solution containing 6.0 parts by mass of styrene (a concentration of 22 mass %) was introduced over 6 minutes, and then a reaction was performed for 10 minutes (the temperature was controlled to 55° C. during polymerization). At this point, the polymer solution was sampled, and the measured polymerization conversion of styrene was 100%.

Next, as a second step, a cyclohexane solution containing 13.4 parts by mass of styrene and 75.6 parts by mass of butadiene (a monomer concentration of 22 mass %) was continuously introduced into the reactor at a constant rate over 90 minutes, and then a reaction was performed for 10 minutes (the temperature was controlled to 60° C. during polymerization, and the difference between the polymerization temperatures was 10° C.). At this point, the polymer solution was sampled, and the measured polymerization conversion of styrene/butadiene was 100%.

Next, as a third step, a cyclohexane solution containing 5 parts by mass of styrene (a concentration of 22 mass %) was introduced over 5 minutes, and then a reaction was performed for 10 minutes (the temperature was controlled to 70° C. during polymerization). At this point, the polymer solution was sampled, and the measured polymerization conversion of styrene was 100%.

Next, the hydrogenation catalyst was added to the resulting copolymer in an amount of 100 ppm in terms of titanium per 100 parts by mass of the copolymer, and a hydrogenation reaction was performed under a hydrogen pressure of 0.7 MPa at a temperature of 70° C.

Thereafter, methanol was added and, next, 0.3 parts by mass of octadecyl-3-(3,5-di-t-butyl-4-hydroxyphenyl)propionate was added as a stabilizer per 100 parts by mass of the copolymer to obtain (polymer 1).

The resulting (polymer 1) had a styrene content of 24.4 mass %, a styrene block (block B) content of 11.0%, an amount of vinyl bonds of the butadiene block portion before hydrogenation of 75.0%, a weight average molecular weight of 145,000, a degree of hydrogenation of 98.0%, and an MFR (temperature of 230° C., a load of 2.16 kg) of 10.0 g/10 min.

Example 2

<Polymer 2: Hydrogenated Product of Butadiene—Styrene—Styrene/Butadiene Random—Styrene (C1-B1-A1-B2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 50° C. Then, 0.076 parts by mass of Bu-Li was added per 100 parts by mass of all the monomers, 1.3 mol of TMEDA was added per mol of Bu-Li, and 0.04 mol of NaOAm was added per mol of Bu-Li.

As a first step, a cyclohexane solution containing 3 parts by mass of butadiene (a concentration of 22 mass %) was introduced over 4 minutes, and then a reaction was performed for 10 minutes (the temperature was controlled to 50° C. during polymerization).

At this point, the polymer solution was sampled, and the measured polymerization conversion of butadiene was 100%.

Next, as a second step, a cyclohexane solution containing 6 parts by mass of styrene (a concentration of 22 mass %) was introduced over 6 minutes, and then a reaction was performed for 10 minutes (the temperature was controlled to 55° C. during polymerization).

At this point, the polymer solution was sampled, and the measured polymerization conversion of butadiene was 100%.

Next, as a third step, a cyclohexane solution containing 21.5 parts by mass of styrene and 64.5 parts by mass of butadiene (a monomer concentration of 22 mass %) was continuously introduced into the reactor at a constant rate over 85 minutes, and then a reaction was performed for 10 minutes (the temperature was controlled to 60° C. during polymerization, and the difference between the polymerization temperatures was 10° C.)

At this point, the polymer solution was sampled, and the measured polymerization conversion of styrene/butadiene was 100%.

Next, as a fourth step, a cyclohexane solution containing 5 parts by mass of styrene (a concentration of 22 mass %) was introduced over 5 minutes, and then a reaction was performed for 10 minutes (the temperature was controlled to 70° C. during polymerization).

At this point, the polymer solution was sampled, and the measured polymerization conversion of styrene was 100%.

Then, the hydrogenation operation was performed in the same manner as in the synthesis of the (polymer 1) to obtain the (polymer 2).

The resulting (polymer 2) had a styrene content of 32.5 mass %, a styrene block (block B) content of 11.0%, an amount of vinyl bonds of the butadiene block portion before hydrogenation of 65.0%, a weight average molecular weight of 143,000, a degree of hydrogenation of 98.0%, and an MFR (temperature of 230° C., a load of 2.16 kg) of 15.0 g/10 min.

Example 3

<Polymer 3: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 45° C. Then, 0.076 parts by mass of Bu-Li was added per 100 parts by mass of all the monomers, 1.3 mol of TMEDA was added per mol of Bu-Li, and 0.04 mol of NaOAm was added per mol of Bu-Li.

As a first step, a cyclohexane solution containing 5.5 parts by mass of styrene (a concentration of 22 mass %) was introduced over 6 minutes, and then a reaction was performed for 10 minutes (the temperature was controlled to 45° C. during polymerization).

At this point, the polymer solution was sampled, and the measured polymerization conversion of styrene was 100%.

Next, as a second step, a cyclohexane solution containing 18 parts by mass of styrene and 72 parts by mass of butadiene (a monomer concentration of 22 mass %) was continuously introduced into the reactor at a constant rate over 90 minutes, and then a reaction was performed for 10 minutes (the temperature was controlled to 48° C. during polymerization, and the difference between the polymerization temperatures was 15° C.)

At this point, the polymer solution was sampled, and the measured polymerization conversion of styrene/butadiene was 100%.

Next, as a third step, a cyclohexane solution containing 4.5 parts by mass of styrene (a concentration of 22 mass %) was introduced over 5 minutes, and then a reaction was performed for 10 minutes (the temperature was controlled to 60° C. during polymerization).

At this point, the polymer solution was sampled, and the measured polymerization conversion of butadiene was 100%.

Then, the hydrogenation operation was performed in the same manner as in the synthesis of the (polymer 1) to obtain the (polymer 3).

The resulting (polymer 3) had a styrene content of 28.0 mass %, a styrene block (block B) content of 10.0%, an amount of vinyl bonds of the butadiene block portion before hydrogenation of 70.0%, a weight average molecular weight of 143,000, a degree of hydrogenation of 98%, and an MFR (temperature of 230° C., a load of 2.16 kg) of 12.0 g/10 min.

Example 4

<Polymer 4: Hydrogenated Product of Styrene—Styrene/Butadiene Random—Styrene (B1-A1-B2)>

The reactor was charged with 1 L of cyclohexane, and the temperature was adjusted to 40° C. Then, the same operation as that for the (polymer 3) was performed to obtain the (polymer 4) except that 0.076 parts by mass of Bu-Li, 1.3 mol of TMEDA, and 0.04 mol of NaOAm were added on the same basis as in the (polymer 1), the temperature during polymerization was controlled to 40° C. as the first step, the temperature during polymerization was controlled to 43° C.

and the difference between the polymerization temperatures was controlled to 18° C. as the second step to produce the block copolymer.

The resulting (polymer 4) had a styrene content of 28.0 mass %, a styrene block (block B) content of 10.0%, an amount of vinyl bonds of the butadiene block portion before hydrogenation of 70.0%, a weight average molecular weight of 143,000, a degree of hydrogenation of 98%, and an MFR (temperature of 230° C., a load of 2.16 kg) of 12.0 g/10 min.

Example 5

<Polymer 5: Hydrogenated Product of Styrene—Styrene/Butadiene Random—Styrene (B1-A1-B2)>

The reactor was charged with 1 L of cyclohexane, and the temperature was adjusted to 55° C. Then, the same operation as that for the (polymer 3) was performed to obtain the (polymer 5) except that 0.077 parts by mass of Bu-Li and 1.1 mol of TMEDA were added on the same basis as in the (polymer 1) (no NaOAm was added), the temperature during polymerization was controlled to 55° C. as the first step, the temperature during polymerization was controlled to 60° C. and the difference between the polymerization temperatures was controlled to 14° C. as the second step, and the temperature during polymerization was controlled to 70° C. as the third step to produce the block copolymer.

The resulting (polymer 5) had a styrene content of 28.0 mass %, a styrene block (block B) content of 10.5%, an amount of vinyl bonds of the butadiene block portion before hydrogenation of 56.0%, a weight average molecular weight of 145,000, a degree of hydrogenation of 98%, and an MFR (temperature of 230° C., a load of 2.16 kg) of 12.0 g/10 min.

Example 6

<Polymer 6: Hydrogenated Product of Styrene—Styrene/Butadiene Random—Styrene (B1-A1-B2)>

The same operation as that for the (polymer 5) was performed to obtain the (polymer 6) except that 0.078 parts by mass of Bu-Li and 1.0 mol of TMEDA were added on the same basis as in the (polymer 1) (no NaOAm was added) to produce the block copolymer.

The resulting (polymer 6) had a styrene content of 28.0 mass %, a styrene block (block B) content of 10.8%, an amount of vinyl bonds of the butadiene block portion before hydrogenation of 53.0%, a weight average molecular weight of 147,000, a degree of hydrogenation of 98%, and an MFR (temperature of 230° C., a load of 2.16 kg) of 12.0 g/10 min.

Example 7

<Polymer 7: Hydrogenated Product of Styrene—Styrene/Butadiene Random—Styrene (B1-A1-B2)>

The reactor was charged with 1 L of cyclohexane, and the temperature was adjusted to 50° C. Then, the same operation as that for the (polymer 5) was performed to obtain the (polymer 7) except that 0.077 parts by mass of Bu—Li, 1.8 mol of TMEDA, and 0.04 mol of NaOAm were added on the same basis as in the (polymer 1), the amount of styrene was set to 5.5 parts by mass as the first step, the amount of styrene was set to 4.8 parts by mass and the amount of butadiene was set to 85.2 parts by mass, the temperature during polymerization was controlled to 55° C., and the difference between the polymerization temperatures was controlled to 10° C. as the second step, and the amount of styrene was set to 4.5 parts by mass and the temperature during polymerization was controlled to 65° C. as the third step as the third step to produce the block copolymer.

The resulting (polymer 7) had a styrene content of 14.8 mass %, a styrene block (block B) content of 10.0%, an amount of vinyl bonds of the butadiene block portion before hydrogenation of 80.0%, a weight average molecular weight of 140,000, a degree of hydrogenation of 98%, and an MFR (temperature of 230° C., a load of 2.16 kg) of 15.0 g/10 min.

Example 8

<Polymer 8: Hydrogenated Product of Styrene—Styrene/Butadiene Random—Styrene (B1-A1-B2)>

The same operation as that for the (polymer 7) was performed to obtain the (polymer 8) except that 0.079 parts by mass of Bu—Li, 1.5 mol of TMEDA, and 0.04 mol of NaOAm were added on the same basis as in the (polymer 1) and the amount of styrene was set to 32 parts by mass, the amount of butadiene was set to 58 parts by mass, the difference between the polymerization temperatures was controlled to 12° C. as the second step to produce the block copolymer.

The resulting (polymer 8) had a styrene content of 42.0 mass %, a styrene block (block B) content of 10.0%, an amount of vinyl bonds of the butadiene block portion before hydrogenation of 60.0%, a weight average molecular weight of 135,000, a degree of hydrogenation of 98%, and an MFR (temperature of 230° C., a load of 2.16 kg) of 10.0 g/10 min.

Example 9

<Polymer 9: Hydrogenated Product of Styrene—Styrene/Butadiene Random—Styrene (B1-A1-B2)>

The same operation as that for the (polymer 1) was performed to obtain the (polymer 9) except that 0.072 parts by mass of Bu—Li, 1.5 mol of TMEDA, and 0.04 mol of NaOAm were added on the same basis as in the (polymer 1) to produce the block copolymer.

The resulting (polymer 9) had a styrene content of 24.4 mass %, a styrene block (block B) content of 11.0%, an amount of vinyl bonds of the butadiene block portion before hydrogenation of 75.0%, a weight average molecular weight of 155,000, a degree of hydrogenation of 98%, and an MFR (temperature of 230° C., a load of 2.16 kg) of 4.8 g/10 min.

Example 10

<Polymer 10: Hydrogenated Product of Styrene—Styrene/Butadiene Random—Styrene (B1-A1-B2)>

The same operation as that for the (polymer 1) was performed to obtain the (polymer 10) except that 0.080 parts by mass of Bu—Li, 1.5 mol of TMEDA, and 0.04 mol of NaOAm were added on the same basis as in the (polymer 1) to produce the block copolymer.

The resulting (polymer 10) had a styrene content of 24.4 mass %, a styrene block (block B) content of 11.0%, an amount of vinyl bonds of the butadiene block portion before hydrogenation of 75.0%, a weight average molecular weight of 132,000, a degree of hydrogenation of 98%, and an MFR (temperature of 230° C., a load of 2.16 kg) of 25.0 g/10 min.

Example 11

<Polymer 11: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 50° C. Then, 0.079 parts by mass of Bu—Li was added per 100 parts by mass of all the monomers, 1.5 mol of TMEDA was added per mol of Bu—Li, and 0.04 mol of NaOAm was added per mol of Bu—Li.

As a first step, a cyclohexane solution containing 9.0 parts by mass of styrene (a concentration of 22 mass %) was introduced over 9 minutes, and then a reaction was performed for 10 minutes (the temperature was controlled to 50° C. during polymerization).

At this point, the polymer solution was sampled, and the measured polymerization conversion of styrene was 100%.

Next, as a second step, a cyclohexane solution containing 33.3 parts by mass of styrene and 50.0 parts by mass of butadiene (a monomer concentration of 22 mass %) was continuously introduced into the reactor at a constant rate over 90 minutes, and then a reaction was performed for 10 minutes (the temperature was controlled to 55° C. during polymerization, and the difference between the polymerization temperatures was 16° C.)

At this point, the polymer solution was sampled, and the measured polymerization conversion of styrene/butadiene was 100%.

Next, as a third step, a cyclohexane solution containing 7.7 parts by mass of styrene (a concentration of 22 mass %) was introduced over 5 minutes, and then a reaction was performed for 10 minutes (the temperature was controlled to 65° C. during polymerization).

At this point, the polymer solution was sampled, and the measured polymerization conversion of butadiene was 100%.

Then, the hydrogenation operation was performed in the same manner as in the synthesis of the (polymer 1) to obtain the (polymer 11).

The resulting (polymer 11) had a styrene content of 50.0 mass %, a styrene block (block B) content of 16.7%, an amount of vinyl bonds of the butadiene block portion before hydrogenation of 75.0%, a weight average molecular weight of 137,000, a degree of hydrogenation of 98%, an MFR (temperature of 230° C., a load of 2.16 kg) of 10.0 g/10 min.

Example 12

<Polymer 12: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 55° C. Then, 0.079 parts by mass of Bu—Li was added per 100 parts by mass of all the monomers, 0.9 mol of TMEDA was added per mol of Bu—Li, and 0.04 mol of NaOAm was added per mol of Bu—Li.

As a first step, a cyclohexane solution containing 3.0 parts by mass of styrene (a concentration of 22 mass %) was introduced over 3 minutes, and then a reaction was performed for 10 minutes (the temperature was controlled to 55° C. during polymerization).

At this point, the polymer solution was sampled, and the measured polymerization conversion of styrene was 100%.

Next, as a second step, a cyclohexane solution containing 4.7 parts by mass of styrene and 90.0 parts by mass of butadiene (a monomer concentration of 22 mass %) continuously introduced into the reactor at a constant rate over 95 minutes, and then a reaction was performed for 10 minutes (the temperature was controlled to 60° C. during polymerization, and the difference between the polymerization temperatures was 15° C.)

At this point, the polymer solution was sampled, and the measured polymerization conversion of styrene/butadiene was 100%.

Next, as a third step, a cyclohexane solution containing 2.3 parts by mass of styrene (a concentration of 22 mass %) was introduced over 5 minutes, and then a reaction was performed for 10 minutes (the temperature was controlled to 70° C. during polymerization).

At this point, the polymer solution was sampled, and the measured polymerization conversion of butadiene was 100%.

Then, the hydrogenation operation was performed in the same manner as in the synthesis of the (polymer 1) to obtain the (polymer 12).

The resulting (polymer 12) had a styrene content of 10.0 mass %, a styrene block (block B) content of 5.3%, an amount of vinyl bonds of the butadiene block portion before hydrogenation of 60.0%, a weight average molecular weight of 140,000, a degree of hydrogenation of 98%, an MFR (temperature of 230° C., a load of 2.16 kg) of 10.0 g/10 min.

Example 13

<Polymer 13: Hydrogenated Product of Styrene—Styrene/Butadiene Random—Styrene (B1-A1-B2)>

The same operation as that for the (polymer 12) was performed to obtain the (polymer 13) except that 0.071 parts by mass of Bu—Li and 1.8 mol of TMEDA were added on the same basis as in the (polymer 1), the temperature during polymerization was controlled to 55° C. and the difference between the polymerization temperatures was controlled to 14° C. as the second step, and the temperature during polymerization was controlled to 65° C. as the third step to produce the block copolymer.

The resulting (polymer 13) had a styrene content of 10.0 mass %, a styrene block (block B) content of 5.3%, an amount of vinyl bonds of the butadiene block portion before hydrogenation of 90.0%, a weight average molecular weight of 152,000, a degree of hydrogenation of 98%, and an MFR (temperature of 230° C., a load of 2.16 kg) of 10.0 g/10 min.

Example 14

<Polymer 14: Hydrogenated Product of Styrene—Styrene/Butadiene Random—Styrene (B1-A1-B2)>

The same operation as that for the (polymer 12) was performed to obtain the (polymer 14) except that 0.075 parts by mass of Bu—Li and 1.3 mol of TMEDA were added on the same basis as in the (polymer 1), and the difference between the polymerization temperatures was controlled to 14° C. as the second step to produce the block copolymer.

The resulting (polymer 14) had a styrene content of 10.0 mass %, a styrene block (block B) content of 5.3%, an amount of vinyl bonds of the butadiene block portion before hydrogenation of 75.0%, a weight average molecular weight of 146,000, a degree of hydrogenation of 98.0%, and an MFR (temperature of 230° C., a load of 2.16 kg) of 10.0 g/10 min.

Example 15

<Polymer 15: Hydrogenated Product of Styrene—Styrene/Butadiene Random—Styrene (B1-A1-B2)>

The same operation as that for the (polymer 1) was performed to obtain the (polymer 15) except that 0.073 parts by mass of Bu—Li was added on the same basis as in the (polymer 1) and the hydrogenation catalyst was added in an amount of 85 ppm in terms of titanium per 100 parts by mass of the polymer.

The resulting (polymer 15) had a styrene content of 24.4 mass %, a styrene block (block B) content of 11.0%, an amount of vinyl bonds of the butadiene block portion before hydrogenation of 75.0%, a weight average molecular weight of 143,000, a degree of hydrogenation of 85.0%, and an MFR (temperature of 230° C., a load of 2.16 kg) of 10.0 g/10 min.

Example 16

<Polymer 16: Hydrogenated Product of Styrene—Styrene/Butadiene Random (B1-A1)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 55° C. Then, 0.073 parts by mass of Bu—Li was added per 100 parts by mass of all the monomers, 1.5 mol of TMEDA was added per mol of Bu—Li, and 0.04 mol of NaOAm was added per mol of Bu—Li.

As a first step, a cyclohexane solution containing 11.0 parts by mass of styrene (a concentration of 22 mass %) was introduced over 11 minutes, and then a reaction was performed for 10 minutes (the temperature was controlled to 55° C. during polymerization).

At this point, the polymer solution was sampled, and the measured polymerization conversion of styrene was 100%.

Next, as a second step, a cyclohexane solution containing 13.4 parts by mass of styrene and 75.6 parts by mass of butadiene (a monomer concentration of 22 mass %) was continuously introduced into the reactor at a constant rate over 90 minutes, and then a reaction was performed for 10 minutes (the temperature was controlled to 60° C. during polymerization, and the difference between the polymerization temperatures was 10° C.)

At this point, the polymer solution was sampled, and the measured polymerization conversion of styrene/butadiene was 100%.

Then, the hydrogenation operation was performed in the same manner as in the synthesis of the (polymer 1) to obtain the (polymer 16).

The resulting (polymer 16) had a styrene content of 24.4 mass %, a styrene block (block B) content of 11.0%, an amount of vinyl bonds of the butadiene block portion before hydrogenation of 75.0%, a weight average molecular weight of 150,000, a degree of hydrogenation of 98%, an MFR (temperature of 230° C., a load of 2.16 kg) of 10.0 g/10 min.

Example 17

<Polymer 17: Hydrogenated Product of Bifunctional Coupling of Styrene-Styrene/Butadiene Random ((B1-A1)×2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 55° C. Then, 0.15 parts by mass of n-butyllithium was added per 100 parts by mass of all the monomers, 1.5 mol of TMEDA was added per mol of n-butyllithium, and 0.04 mol of NaOAm was added per mol of Bu—Li.

As a first step, a cyclohexane solution containing 11 parts by mass of styrene (a concentration of 22 mass %) was introduced over 11 minutes, and then a reaction was performed for 10 minutes (the temperature was controlled to 55° C. during polymerization). At this point, the polymer solution was sampled, and the measured polymerization conversion of styrene was 100%.

Next, as a second step, a cyclohexane solution containing 13.4 parts by mass of styrene and 75.6 parts by mass of butadiene (a concentration of 22 mass %) was continuously introduced into the reactor at a constant rate over 90 minutes, and then a reaction was performed for 30 minutes (the temperature was controlled to 60° C. during polymerization, and the difference between the polymerization temperatures was 10° C.). At this point, the polymer solution was sampled, and the polymerization conversion and the weight average molecular weight of styrene/butadiene measured were a polymerization conversion of 100% and a weight average molecular weight of 73,000.

Thereafter, 1.0 mol of ethyl benzoate was added per mol of the lithium content in n-butyllithium, and a reaction was performed for 10 minutes for a coupling reaction (the temperature was controlled to 70° C. during reaction).

Then, the hydrogenation operation was performed in the same manner as in the synthesis of the (polymer 1) to obtain the (polymer 17).

The resulting (polymer 17) had a styrene content of 24.4 mass %, a styrene block (block B) content of 11.0%, an amount of vinyl bonds of the butadiene block portion before hydrogenation of 75.0%, a weight average molecular weight of 145,000, a degree of hydrogenation of 98%, an MFR (temperature of 230° C., a load of 2.16 kg) of 10.0 g/10 min.

Example 18

<Polymer 18: Hydrogenated Product of Butadiene—Styrene/Butadiene Random—Styrene (C1-A1-B1)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 55° C. Then, 0.071 parts by mass of n-butyllithium was added per 100 parts by mass of all the monomers, 1.4 mol of TMEDA was added per mol of n-butyllithium, and 0.04 mol of NaOAm was added per mol of Bu—Li.

As a first step, a cyclohexane solution containing 3 parts by mass of butadiene (a concentration of 22 mass %) was introduced over 3 minutes, and then a reaction was performed for 10 minutes (the temperature was controlled to 50° C. during polymerization). At this point, the polymer solution was sampled, and the measured polymerization conversion of butadiene was 100%.

Next, as a second step, a cyclohexane solution containing 12.9 parts by mass of styrene and 73.1 parts by mass of butadiene (a concentration of 22 mass %) was continuously introduced into the reactor at a constant rate over 90 minutes, and then a reaction was performed for 30 minutes (the temperature was controlled to 60° C. during polymerization, and the difference between the polymerization temperatures was 10° C.). At this point, the polymer solution was sampled, and the polymerization conversion and the weight average molecular weight of styrene/butadiene were measured, with the result of a polymerization conversion of 100%.

Next, as a third step, a cyclohexane solution containing 11.0 parts by mass of styrene (a concentration of 22 mass %) was introduced over 11 minutes, and then a reaction was performed for 10 minutes (the temperature was controlled to 65° C. during polymerization). At this point, the polymer solution was sampled, and the measured polymerization conversion of styrene was 100%.

Then, the hydrogenation operation was performed in the same manner as in the synthesis of the (polymer 1) to obtain the (polymer 18).

The resulting (polymer 18) had a styrene content of 23.9 mass %, a styrene block (block B) content of 11.0%, an amount of vinyl bonds of the butadiene block portion before hydrogenation of 75.0%, a weight average molecular weight of 152,000, a degree of hydrogenation of 98%, an MFR (temperature of 230° C., a load of 2.16 kg) of 10.0 g/10 min.

Example 19

<Polymer 19: Hydrogenated Product of Styrene—Styrene/Butadiene Random—Styrene (B1-A1-B2)>

The same operation as that for the (polymer 1) was performed to obtain the (polymer 19) except that 0.092 parts by mass of Bu—Li was added on the same basis as in the (polymer 1) to produce the block copolymer.

The resulting (polymer 19) had a styrene content of 24.4 mass %, a styrene block (block B) content of 11.0%, an amount of vinyl bonds of the butadiene block portion before hydrogenation of 75.0%, a weight average molecular weight of 103,000, a degree of hydrogenation of 98%, an MFR (temperature of 230° C., a load of 2.16 kg) of 50.0 g/10 min.

Example 20

<Polymer 20: Hydrogenated Product of Styrene—Styrene/Butadiene Random—Styrene (B1-A1-B2)>

The same operation as that for the (polymer 1) was performed to obtain the (polymer 20) except that 0.071 parts by mass of Bu—Li was added on the same basis as in the (polymer 1) to produce the block copolymer.

The resulting (polymer 20) had a styrene content of 24.4 mass %, a styrene block (block B) content of 11.0%, an amount of vinyl bonds of the butadiene block portion before hydrogenation of 75.0%, a weight average molecular weight of 156,000, a degree of hydrogenation of 98%, an MFR (temperature of 230° C., a load of 2.16 kg) of 1.0 g/10 min.

Example 21

<Polymer 21: Hydrogenated Product of Styrene—Styrene/Butadiene Random—Styrene (B1-A1-B2)>

The same operation as that for the (polymer 1) was performed to obtain the (polymer 21) except that 0.083 parts by mass of Bu—Li and 0.6 mol of TMEDA were added on the same basis as in the (polymer 1) (no NaOAm was added) to produce the block copolymer.

The resulting (polymer 21) had a styrene content of 24.4 mass %, a styrene block (block B) content of 11.0%, an amount of vinyl bonds of the butadiene block portion before hydrogenation of 45.0%, a weight average molecular weight of 124,000, a degree of hydrogenation of 98%, and an MFR (temperature of 230° C., a load of 2.16 kg) of 10.0 g/10 min.

Example 22

<Polymer 22: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 1 L of cyclohexane, and the temperature was adjusted to 50° C. Then, 0.080 parts by mass of Bu—Li was added per 100 parts by mass of all the monomers, 1.5 mol of TMEDA was added per mol of Bu—Li, and 0.04 mol of NaOAm was added per mol of Bu—Li.

As a first step, a cyclohexane solution containing 13.0 parts by mass of styrene (a concentration of 22 mass %) was introduced over 13 minutes, and then a reaction was performed for 10 minutes (the temperature was controlled to 50° C. during polymerization).

At this point, the polymer solution was sampled, and the measured polymerization conversion of styrene was 100%.

Next, as a second step, a cyclohexane solution containing 30.0 parts by mass of styrene and 45.0 parts by mass of butadiene (a monomer concentration of 22 mass %) was continuously introduced into the reactor at a constant rate over 75 minutes, and then a reaction was performed for 10 minutes (the temperature was controlled to 55° C. during polymerization, and the difference between the polymerization temperatures was 18° C.)

At this point, the polymer solution was sampled, and the measured polymerization conversion of styrene/butadiene was 100%.

Next, as a third step, a cyclohexane solution containing 12.0 parts by mass of styrene (a concentration of 22 mass %) was introduced over 5 minutes, and then a reaction was performed for 10 minutes (the temperature was controlled to 65° C. during polymerization).

At this point, the polymer solution was sampled, and the measured polymerization conversion of butadiene was 100%.

Then, the hydrogenation operation was performed in the same manner as in the synthesis of the (polymer 1) to obtain the (polymer 22).

The resulting (polymer 22) had a styrene content of 55.0 mass %, a styrene block (block B) content of 25.0%, an amount of vinyl bonds of the butadiene block portion before hydrogenation of 75.0%, a weight average molecular weight of 139,000, a degree of hydrogenation of 98%, an MFR (temperature of 230° C., a load of 2.16 kg) of 10.0 g/10 min.

Example 23

<Polymer 23: Hydrogenated Product of Styrene—Styrene/Butadiene Random—Styrene (B1-A1-B2)>

The same operation as that for the (polymer 1) was performed to obtain the (polymer 23) except that 0.071 parts by mass of Bu—Li was added on the same basis as in the (polymer 1) and the hydrogenation catalyst was added in an amount of 75 ppm in terms of titanium per 100 parts by mass of the polymer.

The resulting (polymer 23) had a styrene content of 24.4 mass %, a styrene block (block B) content of 11.0%, an amount of vinyl bonds of the butadiene block portion before hydrogenation of 75.0%, a weight average molecular weight of 142,000, a degree of hydrogenation of 75%, and an MFR (temperature of 230° C., a load of 2.16 kg) of 10.0 g/10 min.

Example 24

<Polymer 24: Hydrogenated Product of Styrene—Styrene/Butadiene Random—Styrene (B1-A1-B2)>

The same operation as that for the (polymer 1) was performed to obtain the (polymer 24) except that 0.094 parts by mass of Bu—Li was added on the same basis as in the (polymer 1) to produce the block copolymer.

The resulting (polymer 24) had a styrene content of 24.4 mass %, a styrene block (block B) content of 11.0%, an amount of vinyl bonds of the butadiene block portion before hydrogenation of 75.0%, a weight average molecular weight of 97,000, a degree of hydrogenation of 98%, an MFR (temperature of 230° C., a load of 2.16 kg) of 55.0 g/10 min.

Example 25

<Polymer 25: Hydrogenated Product of Styrene—Styrene/Butadiene Random—Styrene (B1-A1-B2)>

The same operation as that for the (polymer 1) was performed to obtain the (polymer 25) except that 0.078 parts by mass of Bu—Li was added on the same basis as in the (polymer 1) and the difference between the polymerization temperatures was controlled to 20° C. as the second step to produce the block copolymer.

The resulting (polymer 25) had a styrene content of 24.4 mass %, a styrene block (block B) content of 11.5%, an amount of vinyl bonds of the butadiene block portion before hydrogenation of 75.0%, a weight average molecular weight of 138,000, a degree of hydrogenation of 98%, and an MFR (temperature of 230° C., a load of 2.16 kg) of 10.0 g/10 min.

Example 26

<Polymer 26: Hydrogenated Product of Styrene—Styrene/Butadiene Random—Styrene (B1-A1-B2)>

The same operation as that for the (polymer 1) was performed to obtain the (polymer 26) except that 0.074 parts by mass of Bu—Li and 2.0 mol of TMEDA were added on the same basis as in the (polymer 1), and the difference between the polymerization temperatures was controlled to 15° C. as the second step to produce the block copolymer.

The resulting (polymer 26) had a styrene content of 24.4 mass %, a styrene block (block B) content of 11.0%, an amount of vinyl bonds of the butadiene block portion before hydrogenation of 80.0%, a weight average molecular weight of 150,000, a degree of hydrogenation of 98%, and an MFR (temperature of 230° C., a load of 2.16 kg) of 10.0 g/10 min.

Comparative Example 1

<Polymer 27: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 6.4 L of cyclohexane, 0.1 parts by mass of Bu—Li was added per 100 parts by mass of all the monomers, and 220 mol of tetrahydrofuran was added per mol of Bu—Li.

Introduced was 12.5 parts by mass of styrene, and adiabatic polymerization from 50° C. was performed.

Next, after the temperature of the reaction solution was brought to 10° C., 5 parts by mass of styrene and 70 parts by mass of butadiene were introduced thereto, and polymerization was performed.

The difference between the polymerization temperatures at this point was 25° C.

Additionally 12.5 parts by mass of styrene was introduced, and polymerization was performed.

Then, the hydrogenation operation was performed in the same manner as in the synthesis of the (polymer 1) to obtain the (polymer 27).

The resulting (polymer 27) had a styrene content of 30.0 mass %, a styrene block (block B) content of 25.1%, an amount of vinyl bonds of the butadiene block portion before hydrogenation of 77.0%, a weight average molecular weight of 141,000, a degree of hydrogenation of 98%, and an MFR (temperature of 230° C., a load of 2.16 kg) of 10.0 g/10 min.

Comparative Example 2

<Polymer 28: Hydrogenated Product of Styrene-Butadiene-Styrene (B1-C1-B2)>

The same operation as that for the (polymer 1) was performed to obtain the (polymer 28) except that 0.089 parts by mass of Bu—Li, 1.5 mol of TMEDA, and 0.04 mol of NaOAm were added on the same basis as in the (polymer 1) and the amount of butadiene was set to 89 parts by mass, the difference between the polymerization temperatures was controlled to 12° C. as the second step to produce the block copolymer.

The resulting (polymer 28) had a styrene content of 11.0 mass %, a styrene block (block B) content of 11.0%, an amount of vinyl bonds of the butadiene block portion before hydrogenation of 75.0%, a weight average molecular weight of 120,000, a degree of hydrogenation of 98%, and an MFR (temperature of 230° C., a load of 2.16 kg) of 10.0 g/10 min.

Comparative Example 3

<Polymer 29: Hydrogenated Product of Styrene—Styrene/Butadiene Random—Styrene (B1-A1-B2)>

As with the synthesis of the (polymer 1), batch polymerization was performed in the following manner with a stirred jacketed tank reactor having an internal volume of 10 L.

First, the reactor was charged with 5 L of cyclohexane, and the temperature was adjusted to 50° C. Then, 0.075 parts by mass of Bu—Li was added per 100 parts by mass of all the monomers, 1.5 mol of TMEDA was added per mol of Bu—Li, and 0.04 mol of NaOAm was added per mol of Bu—Li.

As the first step, 6.0 parts by mass of styrene was introduced, and adiabatic polymerization from 50° C. was performed.

Next, as the second step, the temperature of the reaction solution was brought to 10° C. Then, 13.4 parts by mass of styrene and 75.6 parts by mass of butadiene were introduced, and polymerization was performed.

The difference between the polymerization temperatures at this point was 25° C.

Next, as the third step, 5 parts by mass of styrene was introduced, and polymerization was performed.

Then, the hydrogenation operation was performed in the same manner as in the synthesis of the (polymer 1) to obtain the (polymer 29).

The resulting (polymer 29) had a styrene content of 24.4 mass %, a styrene block (block B) content of 11.5%, an amount of vinyl bonds of the butadiene block portion before hydrogenation of 75.0%, a weight average molecular weight of 145,000, a degree of hydrogenation of 98%, and an MFR (temperature of 230° C., a load of 2.16 kg) of 10.0 g/10 min.

Analysis results of hydrogenated copolymers (polymers 1 to 29) prepared as described above are shown in Tables 1 and 2 below.

TABLE 1

| Polymer | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Temperature at which the tanδ peak is located (° C.) | −10.0 | −19.0 | −13.0 | −11.0 | −23.0 | −25.0 | −8.0 | −5.0 | −10.0 | −10.0 | 19.0 | −36.0 | −2.0 | −24.0 | −15.0 |
| tanδ peak value | 1.9 | 1.6 | 1.1 | 0.9 | 1.4 | 1.3 | 1.8 | 1.5 | 1.9 | 1.9 | 1.3 | 1.4 | 1.8 | 1.6 | 1.9 |
| tanδ peak half value width (° C.) | 14.0 | 15.5 | 18.5 | 20.4 | 16.5 | 17.0 | 15.0 | 16.0 | 14.0 | 14.0 | 18.0 | 16.0 | 15.0 | 15.5 | 14.0 |

TABLE 1-continued

| Polymer | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Amount of vinyl bonds (%) | 75.0 | 65.0 | 70.0 | 70.0 | 56.0 | 53.0 | 80.0 | 60.0 | 75.0 | 75.0 | 75.0 | 60.0 | 90.0 | 75.0 | 75.0 |
| Amount of TS (styrene content) (mass %) | 24.4 | 32.5 | 28.0 | 28.0 | 28.0 | 28.0 | 14.8 | 42.0 | 24.4 | 24.4 | 50.0 | 10.0 | 10.0 | 10.0 | 24.4 |
| Degree of hydrogenation (%) | 98.0 | 98.0 | 98.0 | 98.0 | 98.0 | 98.0 | 98.0 | 98.0 | 98.0 | 98.0 | 98.0 | 98.0 | 98.0 | 98.0 | 85.0 |
| MFR (g/10 min) | 10.0 | 15.0 | 12.0 | 12.0 | 12.0 | 12.0 | 15.0 | 10.0 | 4.8 | 25.0 | 10.0 | 10.0 | 10.0 | 10.0 | 10.0 |
| Mw (10,000) | 14.5 | 14.3 | 14.3 | 14.3 | 14.5 | 14.7 | 14.0 | 13.5 | 15.5 | 13.2 | 13.7 | 14.0 | 15.2 | 14.6 | 14.3 |

TABLE 2

| Polymer | 16 | 17 | 18 | 19 | 20 | 21 | 22 | 23 | 24 | 25 | 26 | 27 | 28 | 29 |
|---|---|---|---|---|---|---|---|---|---|---|---|---|---|---|
| Temperature at which the tanδ peak exists (° C.) | −10.0 | −10.0 | −13.0 | −10.0 | −10.0 | −32.0 | 11.0 | −17.0 | −10.0 | −5.0 | −6.0 | −3.0 | −28.0 | −1.0 |
| tanδ peak value | 1.9 | 1.9 | 1.5 | 1.9 | 1.9 | 1.2 | 1.2 | 1.9 | 1.9 | 1.0 | 1.8 | 0.6 | 1.6 | 0.6 |
| tanδ peak half value width (° C.) | 14.0 | 14.0 | 18.0 | 14.0 | 14.0 | 17.5 | 20.0 | 14.0 | 14.0 | 21.0 | 16.0 | 22.5 | 17.0 | 22.5 |
| Amount of vinyl bonds (%) | 75.0 | 75.0 | 75.0 | 75.0 | 75.0 | 45.0 | 75.0 | 75.0 | 75.0 | 75.0 | 80.0 | 77.0 | 75.0 | 75.0 |
| Amount of TS (styrene content) (mass %) | 24.4 | 24.4 | 23.9 | 24.4 | 24.4 | 24.4 | 55.0 | 24.4 | 24.4 | 24.4 | 24.4 | 30.0 | 11.0 | 24.4 |
| Degree of hydrogenation (%) | 98.0 | 98.0 | 98.0 | 98.0 | 98.0 | 98.0 | 98.0 | 75.0 | 98.0 | 98.0 | 98.0 | 98.0 | 98.0 | 98.0 |
| MFR (g/10 min) | 10.0 | 10.0 | 10.0 | 50.0 | 1.0 | 10.0 | 10.0 | 10.0 | 55.0 | 10.0 | 10.0 | 10.0 | 10.0 | 10.0 |
| Mw (10,000) | 15.0 | 14.5 | 15.2 | 10.3 | 15.6 | 12.4 | 13.9 | 14.2 | 9.7 | 13.8 | 15.0 | 14.1 | 12.0 | 14.5 |

(Characteristic Evaluation of Surface Protection Film Including Polymer of Examples 1 to 26 and Comparative Examples 1 to 3)

Polypropylene (manufactured by SunAllomer Ltd., trade name "PC684S", MFR (230° C., 2.16 kg load)=7.5 g/10 min) constituting the substrate layer and a hydrogenated copolymer constituting the tacky adhesive layer were each supplied to an extruder, and both layers were coextruded to be combined by a T-die coextrusion method to prepare surface protection films having a substrate layer thickness of 40 μm and a tacky adhesive layer thickness of 10 μm.

Surface protection films including a tacky adhesive layer each composed of polymers 1 to 29 obtained in Examples 1 to 26 and Comparative Examples 1 to 3 were used to evaluate the adhesion, initial tackiness, increase in tackiness, adhesive residue, stop mark, and easy peelability between tacky surfaces of surface protection films described above.

Evaluation results are shown in Tables 3 and 4 below.

TABLE 3

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Polymer | 1 | 2 | 3 | 4 | 5 | 6 | 7 | 8 | 9 | 10 | 11 | 12 | 13 | 14 | 15 |
| Adhesion | ◎ | ◎ | ◎ | ◎ | ◎ | ◎ | ○ | ◎ | ○ | ○ | ◎ | ○ | ○ | ◎ | ○ | ◎ |
| Initial tackiness | ◎ | ◎ | ◎ | ○ | ○ | ○ | ◎ | ○ | ○ | ◎ | ○ | ○ | ◎ | ◎ | ◎ |
| Increase in tackiness | ◎ | ◎ | ○ | ○ | ◎ | ◎ | ○ | ○ | ◎ | ○ | ○ | ○ | ○ | ○ | ○ |
| Adhesive residue | ◎ | ◎ | ○ | ○ | ◎ | ◎ | ○ | ○ | ◎ | ◎ | ○ | ○ | ○ | ○ | ○ |
| Stop mark | ◎ | ◎ | ◎ | ○ | ◎ | ◎ | ○ | ◎ | ◎ | ◎ | ◎ | ◎ | ○ | ○ | ◎ |
| Easy peelability between tacky surfaces | ◎ | ◎ | ◎ | ◎ | ◎ | ◎ | ○ | ◎ | ◎ | ◎ | ◎ | ○ | ○ | ○ | ○ |

TABLE 4

| | | | | | | | | | | | | Comparative Example | | |
|---|---|---|---|---|---|---|---|---|---|---|---|---|---|---|
| | 16 | 17 | 18 | 19 | 20 | 21 | 22 | 23 | 24 | 25 | 26 | 1 | 2 | 3 |
| Polymer | 16 | 17 | 18 | 19 | 20 | 21 | 22 | 23 | 24 | 25 | 26 | 27 | 28 | 29 |
| Adhesion | ◎ | ◎ | ◎ | ◎ | X | X | X | ◎ | ◎ | ◎ | ◎ | ○ | ○ | ○ |
| Initial tackiness | ◎ | ◎ | ◎ | ◎ | ○ | X | ○ | ◎ | ◎ | ◎ | ◎ | ○ | ◎ | ○ |
| Increase in tackiness | ◎ | ◎ | ◎ | ○ | ◎ | ○ | ◎ | ○ | X | X | ○ | X | X | X |
| Adhesive residue | ◎ | ◎ | ○ | X | ◎ | ◎ | ◎ | X | X | ○ | ○ | X | X | X |
| Stop mark | ○ | ◎ | X | X | ◎ | ◎ | ○ | ○ | X | ○ | X | X | X | X |
| Easy peelability between tacky surfaces | ◎ | ◎ | ○ | ○ | ◎ | ◎ | ◎ | ○ | ○ | ○ | ○ | X | X | X |

As shown in Tables 3 and 4, in Examples 1 to 26, all demonstrated excellent easy peelability between tacky surfaces.

Moreover, Examples 1 to 17 demonstrated excellent properties also in the adhesion, initial tackiness, increase in tackiness, stop mark, and adhesive residue.

Meanwhile, in Comparative Examples 1 and 3, the polymers 25 and 27 has a tan δ low peak height and a wide half value width. Thus, when tacky surfaces adhered to each other, some portions were attached excessively, and the property of easy peelability between the tacky surfaces deteriorated. Moreover, also in the increase in tackiness, stop mark, and adhesive residue, practically good evaluation was not achieved.

In Comparative Example 2, the polymer 26 contains no copolymer block A containing styrene and butadiene. Although the initial tack strength was excellent, tacky surfaces excessively adhered to each other when attached, and the property of easy peelability between tacky surfaces deteriorated. Moreover, also in the increase in tackiness, stop mark, and adhesive residue, practically good evaluation was not achieved.

The present application is based on a Japanese patent application (Japanese Patent Application No. 2016-008245) filed with the Japanese Patent Office on Jan. 19, 2016, the content of which is incorporated herein by reference.

INDUSTRIAL APPLICABILITY

The hydrogenated copolymer of the present embodiment has industrial applicability as materials such as plastic modifying materials, asphalt modifying materials, automotive parts (automotive interior materials and automotive exterior materials), various containers such as food packaging containers, consumer electrical appliances, medical device parts, industrial parts, toys, footwear, viscous adhesive materials, and surface protection films for various products and parts.

The invention claimed is:

1. A hydrogenated copolymer comprising
   a copolymer block A comprising a vinyl aromatic compound monomer unit and a conjugated diene monomer unit,
   wherein a tan δ peak obtained by dynamic viscoelasticity measurement (1 Hz) is in the range of −40° C. to 20° C.,
   wherein a value of the tan δ peak is 0.8 or more,
   wherein a half value width of the tan δ peak is 22° C. or less, and
   wherein the hydrogenated copolymer has a melt flow rate (g/10 min) of 1 to 50 g/10 min at a temperature of 230° C. under a load of 2.16 kg.

2. The hydrogenated copolymer according to claim 1, wherein the conjugated diene monomer unit in the hydrogenated copolymer has an amount of vinyl bonds of 50% or more before hydrogenation.

3. The hydrogenated copolymer according to claim 1 wherein a content of the vinyl aromatic compound monomer unit in the hydrogenated copolymer is 10 to 50 mass %.

4. The hydrogenated copolymer according to claim 1, wherein a mass ratio of the vinyl aromatic monomer unit to the conjugated diene monomer unit contained in the copolymer block A of the hydrogenated copolymer is vinyl aromatic monomer unit/conjugated diene monomer unit=5/95 to 40/60.

5. The hydrogenated copolymer according to claim 1, wherein the hydrogenated copolymer has a degree of hydrogenation of double bonds based on the conjugated diene monomer unit of 85% or more.

6. The hydrogenated copolymer according to claim 1, having a structure of $B\text{-}(A\text{-}B)_n$, $(B\text{-}A)_n$, $[(B\text{-}A)_n]_m\text{-}X$, or $C\text{—}(B\text{-}A\text{-}B)_n$,
   wherein:
   A: a copolymer block comprising a vinyl aromatic compound monomer unit and a conjugated diene monomer unit,
   B: a polymer block of a vinyl aromatic compound monomer,
   C: a polymer block of a conjugated diene monomer,
   m: an integer of 2 or greater,
   n: an integer of 1 or greater, and
   wherein X represents a residue of a coupling agent or a polyfunctional initiator residue.

7. The hydrogenated copolymer according to claim 1, having a weight average molecular weight of 50,000 to 200,000.

8. A composition comprising the hydrogenated copolymer according to claim 1.

9. A molded article comprising the hydrogenated copolymer according to claim 1.

10. A surface protection film comprising the hydrogenated copolymer according to claim 1.

* * * * *